US012175300B2

(12) United States Patent
Havlir et al.

(10) Patent No.: US 12,175,300 B2
(45) Date of Patent: *Dec. 24, 2024

(54) SOFTWARE CONTROL TECHNIQUES FOR GRAPHICS HARDWARE THAT SUPPORTS LOGICAL SLOTS AND RESERVATION OF GRAPHICS HARDWARE BASED ON A PRIORITY THRESHOLD

(71) Applicant: Apple Inc., Cupertino, CA (US)

(72) Inventors: Andrew M. Havlir, Orlando, FL (US);
Steven Fishwick, Kings Langley (GB);
Melissa L. Velez, Orlando, FL (US)

(73) Assignee: Apple Inc., Cupertino, CA (US)

( * ) Notice: Subject to any disclaimer, the term of this patent is extended or adjusted under 35 U.S.C. 154(b) by 162 days.

This patent is subject to a terminal disclaimer.

(21) Appl. No.: 17/399,759

(22) Filed: Aug. 11, 2021

(65) Prior Publication Data

US 2023/0051906 A1 Feb. 16, 2023

(51) Int. Cl.
*G06F 9/50* (2006.01)
*G06F 9/48* (2006.01)

(52) U.S. Cl.
CPC .......... *G06F 9/5066* (2013.01); *G06F 9/4881* (2013.01); *G06F 9/5044* (2013.01);
(Continued)

(58) Field of Classification Search
CPC .... G06F 9/5066; G06F 9/4881; G06F 9/5044; G06F 9/505; G06F 9/5055; G06F 9/5083;
(Continued)

(56) References Cited

U.S. PATENT DOCUMENTS 6,088,779 A * 7/2000 Bharadhwaj ............ G06F 9/461
711/147
6,332,191 B1 12/2001 Witt
(Continued)

FOREIGN PATENT DOCUMENTS

CN 102982505 A 3/2013
CN 103124957 A 5/2013
(Continued)

OTHER PUBLICATIONS

Zhao et al. CN110764901A Description Translation, Feb. 7, 2020, [database online], [retrieved on Jun. 1, 2023] Retrieved from Espacenet using Internet <URL:https://worldwide.espacenet.com/publication Details/description?CC=CN&NR=110764901A&KC=A&FT=D&ND=3&date=20200207&DB=&locale=en_EP>, pp. 1-33 (Year: 2020).*

(Continued)

*Primary Examiner* — Meng Ai T An
*Assistant Examiner* — Hsing Chun Lin
(74) *Attorney, Agent, or Firm* — Kowert, Hood, Munyon, Rankin & Goetzel, P.C.; Michael B. Davis; Dean M. Munyon

(57) ABSTRACT

Disclosed embodiments relate to software control of graphics hardware that supports logical slots. In some embodiments, a GPU includes circuitry that implements a plurality of logical slots and a set of graphics processor sub-units that each implement multiple distributed hardware slots. Control circuitry may determine mappings between logical slots and distributed hardware slots for different sets of graphics work. Various mapping aspects may be software-controlled. For example, software may specify one or more of the following: priority information for a set of graphics work, to retain the mapping after completion of the work, a distribution rule, a target group of sub-units, a sub-unit mask, a sched-
(Continued)

Example reserved hardware slots for high-priority logical slots

Reserved dSlot(s) in an mGPU. High priority logical slots attempt to use these first, then use other dSlot(s)

Other dSlot(s) in the mGPU. Low priority logical slots can only use these dSlot(s)

uling policy, to reclaim hardware slots from another logical slot, etc. Software may also query status of the work.

20 Claims, 29 Drawing Sheets

(52) U.S. Cl.
CPC ............ *G06F 9/505* (2013.01); *G06F 9/5055* (2013.01); *G06F 9/5083* (2013.01)

(58) Field of Classification Search
CPC ........... G06F 2209/5014; G06F 9/5038; G06F 2209/509
See application file for complete search history.

(56) References Cited

U.S. PATENT DOCUMENTS

| | | | |
|---|---|---|---|
| 6,363,471 | B1 | 3/2002 | Meier |
| 6,481,251 | B1 | 11/2002 | Meier |
| 6,519,678 | B1 * | 2/2003 | Basham ............... G06F 3/0601 700/214 |
| 7,406,587 | B1 | 7/2008 | Zhang |
| 8,115,773 | B2 * | 2/2012 | Swift .................... G06T 15/005 712/216 |
| 8,120,608 | B2 | 2/2012 | Jiao et al. |
| 8,174,534 | B2 | 5/2012 | Jiao |
| 10,026,145 | B2 | 7/2018 | Bourd et al. |
| 10,325,341 | B2 | 6/2019 | Vembu et al. |
| 11,074,109 | B2 | 7/2021 | Valerio et al. |
| 11,714,995 | B2 | 8/2023 | Wang |
| 2007/0030280 | A1 | 2/2007 | Paltashev et al. |
| 2008/0266296 | A1 | 10/2008 | Ramey et al. |
| 2008/0303846 | A1 | 12/2008 | Brichter |
| 2010/0123717 | A1 | 5/2010 | Jiao |
| 2010/0251016 | A1 | 9/2010 | Abernathy |
| 2011/0302585 | A1 | 12/2011 | Dice |
| 2012/0320070 | A1 | 12/2012 | Arvo |
| 2013/0021353 | A1 * | 1/2013 | Drebin ..................... G06T 1/60 345/522 |
| 2013/0064275 | A1 | 3/2013 | Mourad et al. |
| 2013/0290971 | A1 | 10/2013 | Chen et al. |
| 2014/0123145 | A1 | 5/2014 | Barrow-Williams et al. |
| 2014/0373028 | A1 | 12/2014 | Lyashevsky et al. |
| 2014/0380003 | A1 | 12/2014 | Hsu et al. |
| 2015/0235341 | A1 | 8/2015 | Mei et al. |
| 2016/0062894 | A1 | 3/2016 | Schwetman, Jr. et al. |
| 2016/0266901 | A1 | 9/2016 | Winkel et al. |
| 2016/0349832 | A1 | 12/2016 | Jiao |
| 2017/0069054 | A1 | 3/2017 | Ramadoss et al. |
| 2017/0178386 | A1 | 6/2017 | Redshaw et al. |
| 2018/0060995 | A1 | 3/2018 | Doyle |
| 2018/0089881 | A1 | 3/2018 | Johnson |
| 2018/0349204 | A1 | 12/2018 | Liu |
| 2019/0019267 | A1 | 1/2019 | Suresh |
| 2019/0155660 | A1 | 5/2019 | McQuighan et al. |
| 2019/0188148 | A1 | 6/2019 | Dong |
| 2019/0206018 | A1 | 7/2019 | Khodakovsky et al. |
| 2019/0318446 | A1 | 10/2019 | Ray et al. |
| 2019/0369707 | A1 | 12/2019 | Iwamoto et al. |
| 2019/0370059 | A1 | 12/2019 | Puthoor et al. |
| 2020/0043123 | A1 | 2/2020 | Dash et al. |
| 2020/0104180 | A1 | 4/2020 | Banerjee et al. |
| 2020/0175645 | A1 | 6/2020 | King et al. |
| 2020/0183700 | A1 | 6/2020 | Battle et al. |
| 2020/0183779 | A1 | 6/2020 | Cariello |
| 2020/0201690 | A1 | 6/2020 | Sankaralingam et al. |
| 2020/0293380 | A1 | 9/2020 | Ashbaugh et al. |
| 2020/0310883 | A1 | 10/2020 | Valerio et al. |
| 2020/0312006 | A1 | 10/2020 | Du et al. |
| 2020/0356366 | A1 | 11/2020 | Battle |
| 2020/0401529 | A1 | 12/2020 | Zhang et al. |
| 2020/0410628 | A1 | 12/2020 | Shah et al. |
| 2021/0104010 | A1 | 4/2021 | Bakalash |
| 2021/0110506 | A1 | 4/2021 | Prakash et al. |
| 2021/0294646 | A1 | 9/2021 | Hassaan et al. |
| 2021/0294648 | A1 | 9/2021 | Champigny |
| 2022/0207813 | A1 | 6/2022 | Godey |
| 2022/0308938 | A1 | 9/2022 | Iyer et al. |

FOREIGN PATENT DOCUMENTS

| | | | | |
|---|---|---|---|---|
| CN | 110322390 | A | | 10/2019 |
| CN | 110764901 | A * | 2/2020 | ......... G06F 9/45558 |
| CN | 112527513 | A | | 3/2021 |
| JP | 2008-538620 | A | | 10/2008 |
| JP | 2008-276740 | A | | 11/2008 |
| JP | 2020-109625 | A | | 7/2020 |
| JP | 2020-113252 | A | | 7/2020 |
| KR | 10-2012-0031759 | A | | 4/2012 |
| KR | 10-2020-0086613 | A | | 7/2020 |
| KR | 20200086613 | A | | 7/2020 |
| WO | 2019165428 | A1 | | 8/2019 |

OTHER PUBLICATIONS

International Search Report and Written Opinion in PCT Appl. No. PCT/US2022/037716 mailed Oct. 28, 2022, 8 pages.
Office Action in U.S. Appl. No. 17/399,711 mailed Nov. 24, 2023, 13 pages.
Owen Harrison, Practical Symmetric Key Cryptography on Modern Graphics Hardware. (Year: 2008).
Office Action in ROC (Taiwan) Pat. Appln. No. 111130152 mailed Oct. 26, 2023, 9 pages.
Notice of Allowance in U.S. Appl. No. 17/399,711 mailed Mar. 12, 2024.
Machi Xue et al., "Scalable GPU Virtualization with Dynamic Sharing of Graphics Memory Space," IEE Transactions on Parallel and Distributed Systems, vol. 29, No. 8, Aug. 2018, pp. 1823-1836.
Zahaf et al., "Contention-Aware GPU Partitioning and Task-to-Partition Allocation for Real-Time Workloads," Apr. 9, 2021, Association for Computing Machinery; https://doi.org/10.1145/3453417.3453439, pp. 226-236.
Jain et al., "Fractional GPUs: Software-based Compute and Memory Bandwidth Reservation for GPUs," 2019 IEEE Real-Time and Embedded Technology and Applications Symposium (RTAS), pp. 29-41.
Office Action in Japanese Pat. Application No. 2024-506912 mailed Jul. 23, 2024, 2 pages.
European Search Report in Appl. No. 22856404.3 mailed Oct. 31, 2024, 13 pages.

* cited by examiner

FIG. 7

Example software override fields

| Name | Description | Example Values |
|---|---|---|
| mGPU mask | Which mGPUs can be used by this kick | • 1 bit per mGPU |
| Distribution mode | Number of distributed slots to be allocated | • Default<br>• Single mGPU<br>• Single group<br>• All mGPUs |
| Force group | Group selection | • No force<br>• Force group 0<br>• ...<br>• Force group N |
| Policy | Scheduling policy | • Select first option<br>• Round robin |

FIG. 9

Example dSlot arbitration, single mGPU distribution mode

Determine set of allowable mGPUs based on Force Group and mGPU mask
1010

↓

Pick mGPU where logical slot already owns dSlot in EMPTIED state
1012

↓

Pick mGPU with at least one INVALID dSlot where logical slot does NOT already own a dSlot
1014

↓

Pick mGPU with most INVALID dSlots
1016

↓

Pick mGPU where logical slot already owns dSlot in RUNNING state
1018

↓

Attempt reclaim
1020

↓

Restart allocation machine and re-arbitrate
1022

*FIG. 10A*

Example dSlot arbitration, single group distribution mode

Determine set of allowable mGPUs based on Force Group and mGPU mask
1030

↓

Pick group where all mGPUs have a dSlot owned in EMPTIED or INVALID state (pick group with least INVALID in case of tie)
1032

↓

Pick group where all mGPU have a dSlot owned in RUNNING, INVALID, or EMPTY state (pick group with least RUNNING, in case of tie)
1034

↓

Attempt reclaim
1038

↓

Restart allocation machine and re-arbitrate
1040

*FIG. 10B*

| Hold value | Example logical slot status |
|---|---|
| Low | Logical slot has reached control stream terminate, no kernels left in queue to process. This logical slot will not require another dSlot |
| Medium | Logical slot has not reached control stream terminate, but there are no kernels requesting dSlots for execution |
| High | Logical slot has a kernel requesting dSlots for execution |

FIG. 11A

Find dSlots in FLUSHING state. These dSlots are a flushing_set.
1110

Find dSlots in flushing_set + dSlots in allowed_set with low hold value
(allowed_set = dSlots that are EMPTIED and are owned by logical slot that is not context storing and does not have any flushing dSlots)
1120

If requestor is low priority logical slot:
- do_set = dSlots in allowed_set with medium hold value that are owned by low priority logical slots
- Find dSlots in flushing_set + do_set If requestor is high priority logical slot:
- do_set = dSlots in allowed_set with medium hold value that are owned by high priority logical slots
- Find dSlots in flushing_set + do_set
1130

Add to do_set: slots in allowed_set with high hold value that belong to a logical slot with a lower priority and lower age
Find slots in do_set + flushing_set
1140

FIG. 11B

| Cache flush invalidate command 1410 | Unconditional? | |

*Example register prefetch buffer*

| Type | Setup | Setup | Setup | ... | Exec. | Exec. | Exec. |
|---|---|---|---|---|---|---|---|
| Offset | 0 | 1 | 12 | ... | 7 | 6 | 2 |
| Payload | A | B | F | ... | E | D | C |

*FIG. 20*

Receive a software-specified compute kernel and a software-indicated mapping of portions of the compute kernel to groups of graphics processor sub-units
2410

Assign, based on the mapping, a first subset of the compute kernel to the first group of graphics sub-units and a second subset of the compute kernel to the second group of graphics sub-units.
2420

SOFTWARE CONTROL TECHNIQUES FOR GRAPHICS HARDWARE THAT SUPPORTS LOGICAL SLOTS AND RESERVATION OF GRAPHICS HARDWARE BASED ON A PRIORITY THRESHOLD

BACKGROUND

Technical Field

This disclosure relates generally to graphics processors and more particularly to techniques for distributing graphics work in graphics processors with multiple replicated processing elements.

Description of the Related Art

Given their growing compute capabilities, graphics processing units (GPUs) are now being used extensively for large-scale workloads. Workloads may include vertex shader, fragment shader, and compute tasks, for example. APIs such as Metal and OpenCL give software developers an interface to access the compute power of the GPU for their applications. In recent times, software developers have been moving substantial portions of their applications to using the GPU.

As process technologies shrink and GPUs become more powerful, they may contain large numbers of shader cores. Software or firmware may provide units of work to be performed, referred to as "kicks." Data master circuitry (e.g., a compute data master, vertex data master, and pixel data master) may distribute work from these kicks to multiple replicated shader cores, e.g., over a communications fabric. As the number of shaders scales, work distribution and scheduling techniques may substantially affect performance and power consumption.

BRIEF DESCRIPTION OF THE DRAWINGS

FIG. 7 is a diagram illustrating example distributed slot states and kernel residency information, according to some embodiments.

FIG. 9 is a diagram illustrating example software override fields, according to some embodiments.

FIGS. 10A-10C are flow diagram illustrating example techniques for selecting hardware slots based on hardware slot state for different example distribution modes, according to some embodiments.

FIG. 11A is a diagram illustrating example logical slot hold status values, according to some embodiments.

FIG. 11B is a flow diagram illustrating example techniques for reclaiming hardware slots, according to some embodiments.

FIG. 20 is a diagram illustrating an example register prefetch buffer for a kickslot manager, according to some embodiments.

DETAILED DESCRIPTION

Figure 1A:
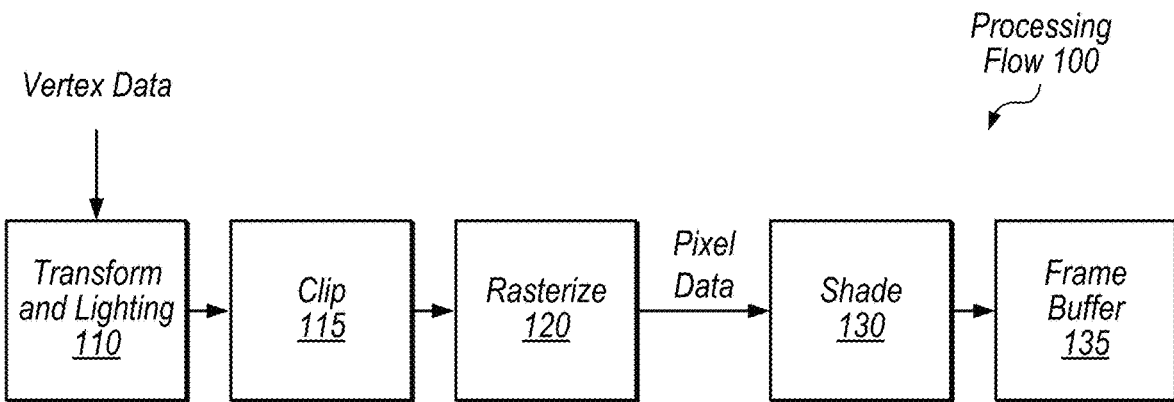
FIG. 1A is a diagram illustrating an overview of example graphics processing operations, according to some embodiments.
Figure 1B:
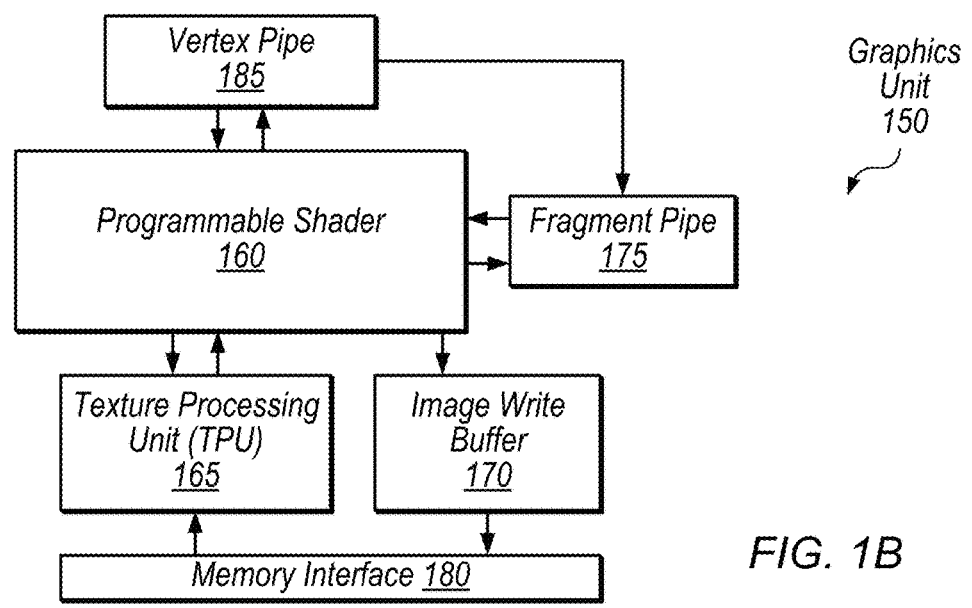
FIG. 1B is a block diagram illustrating an example graphics unit, according to some embodiments.
Figure 21:
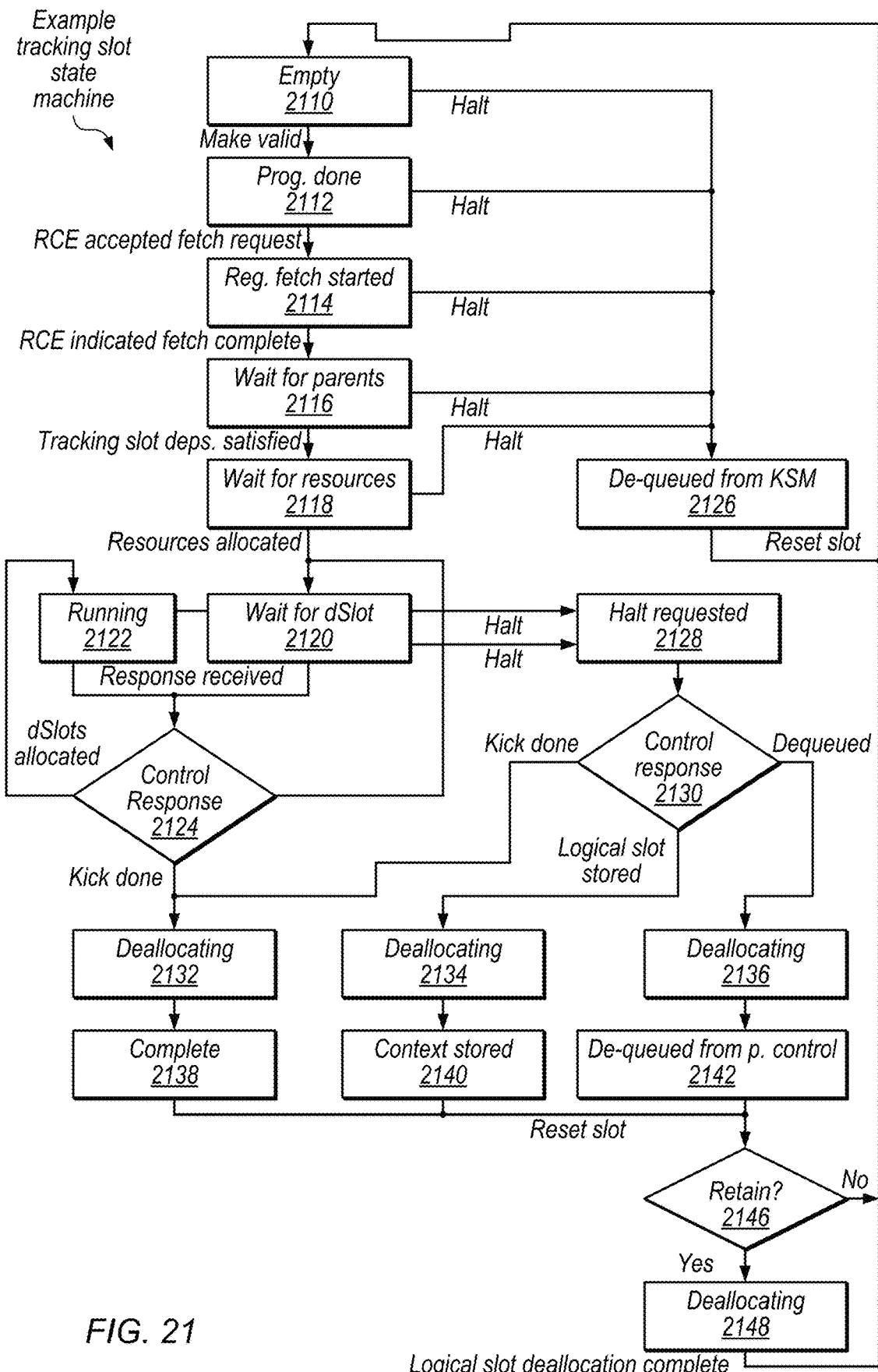
FIG. 21 is a diagram illustrating an example state machine for a top slot handled by the kickslot manager, according to some embodiments.

This disclosure covers various techniques relating to logical kickslots and distribution of work from logical kickslots to distributed hardware. FIGS. 1A-1B provide an overview of graphics processors. FIGS. 2-8 provide an overview of techniques for mapping logical slots to distributed hardware slots for graphics processing. FIG. 9 shows example software overrides that may affect the mapping. FIGS. 10-14 show example techniques for enforcing distribution modes, reclaiming hardware slots, retaining hardware slots, providing logical slot priority, and handling cache flush operations in the context of logical slot mapping. FIGS. 15-18 show example techniques for affinity-based scheduling. FIGS. 19-21 show a kickslot manager that interfaces with software and configures logical slots. The remaining figures show example methods, systems, applications, etc. In various embodiments, disclosed techniques may advantageously improve performance or reduce power consumption for graphics processors, relative to traditional techniques, as explained in detail below.

Graphics Processing Overview

Referring to FIG. 1A, a flow diagram illustrating an example processing flow 100 for processing graphics data is shown. In some embodiments, transform and lighting procedure 110 may involve processing lighting information for vertices received from an application based on defined light source locations, reflectance, etc., assembling the vertices into polygons (e.g., triangles), and transforming the polygons to the correct size and orientation based on position in a three-dimensional space. Clip procedure 115 may involve discarding polygons or vertices that fall outside of a viewable area. Rasterize procedure 120 may involve defining fragments within each polygon and assigning initial color values for each fragment, e.g., based on texture coordinates of the vertices of the polygon. Fragments may specify attributes for pixels which they overlap, but the actual pixel attributes may be determined based on combining multiple fragments (e.g., in a frame buffer), ignoring one or more fragments (e.g., if they are covered by other objects), or both. Shade procedure 130 may involve altering pixel components based on lighting, shadows, bump mapping, translucency, etc. Shaded pixels may be assembled in a frame buffer 135. Modern GPUs typically include programmable shaders that allow customization of shading and other processing procedures by application developers. Thus, in various embodiments, the example elements of FIG. 1A may be performed in various orders, performed in parallel, or omitted. Additional processing procedures may also be implemented.

Referring now to FIG. 1B, a simplified block diagram illustrating a graphics unit 150 is shown, according to some embodiments. In the illustrated embodiment, graphics unit 150 includes programmable shader 160, vertex pipe 185, fragment pipe 175, texture processing unit (TPU) 165, image write unit 170, and memory interface 180. In some embodiments, graphics unit 150 is configured to process both vertex and fragment data using programmable shader 160, which may be configured to process graphics data in parallel using multiple execution pipelines or instances.

Vertex pipe 185, in the illustrated embodiment, may include various fixed-function hardware configured to process vertex data. Vertex pipe 185 may be configured to communicate with programmable shader 160 in order to coordinate vertex processing. In the illustrated embodiment, vertex pipe 185 is configured to send processed data to fragment pipe 175 or programmable shader 160 for further processing.

Fragment pipe 175, in the illustrated embodiment, may include various fixed-function hardware configured to process pixel data. Fragment pipe 175 may be configured to communicate with programmable shader 160 in order to coordinate fragment processing. Fragment pipe 175 may be configured to perform rasterization on polygons from vertex pipe 185 or programmable shader 160 to generate fragment data. Vertex pipe 185 and fragment pipe 175 may be coupled to memory interface 180 (coupling not shown) in order to access graphics data.

Programmable shader 160, in the illustrated embodiment, is configured to receive vertex data from vertex pipe 185 and fragment data from fragment pipe 175 and TPU 165. Programmable shader 160 may be configured to perform vertex processing tasks on vertex data which may include various transformations and adjustments of vertex data. Programmable shader 160, in the illustrated embodiment, is also configured to perform fragment processing tasks on pixel data such as texturing and shading, for example. Programmable shader 160 may include multiple sets of multiple execution pipelines for processing data in parallel.

In some embodiments, programmable shader includes pipelines configured to execute one or more different SIMD groups in parallel. Each pipeline may include various stages configured to perform operations in a given clock cycle, such as fetch, decode, issue, execute, etc. The concept of a processor "pipeline" is well understood, and refers to the concept of splitting the "work" a processor performs on instructions into multiple stages. In some embodiments, instruction decode, dispatch, execution (i.e., performance), and retirement may be examples of different pipeline stages. Many different pipeline architectures are possible with varying orderings of elements/portions. Various pipeline stages perform such steps on an instruction during one or more processor clock cycles, then pass the instruction or operations associated with the instruction on to other stages for further processing.

The term "SIMD group" is intended to be interpreted according to its well-understood meaning, which includes a set of threads for which processing hardware processes the same instruction in parallel using different input data for the different threads. Various types of computer processors may include sets of pipelines configured to execute SIMD instructions. For example, graphics processors often include programmable shader cores that are configured to execute instructions for a set of related threads in a SIMD fashion. Other examples of names that may be used for a SIMD group include: a wavefront, a clique, or a warp. A SIMD group may be a part of a larger thread group, which may be broken up into a number of SIMD groups based on the parallel processing capabilities of a computer. In some embodiments, each thread is assigned to a hardware pipeline that fetches operands for that thread and performs the specified operations in parallel with other pipelines for the set of threads. Note that processors may have a large number of pipelines such that multiple separate SIMD groups may also execute in parallel. In some embodiments, each thread has private operand storage, e.g., in a register file. Thus, a read of a particular register from the register file may provide the version of the register for each thread in a SIMD group.

In some embodiments, multiple programmable shader units 160 are included in a GPU. In these embodiments, global control circuitry may assign work to the different sub-portions of the GPU which may in turn assign work to shader cores to be processed by shader pipelines.

TPU 165, in the illustrated embodiment, is configured to schedule fragment processing tasks from programmable shader 160. In some embodiments, TPU 165 is configured to pre-fetch texture data and assign initial colors to fragments for further processing by programmable shader 160 (e.g., via memory interface 180). TPU 165 may be configured to provide fragment components in normalized integer formats or floating-point formats, for example. In some embodiments, TPU 165 is configured to provide fragments in groups of four (a "fragment quad") in a 2×2 format to be processed by a group of four execution pipelines in programmable shader 160.

Image write unit (IWU) 170, in some embodiments, is configured to store processed tiles of an image and may perform operations to a rendered image before it is transferred for display or to memory for storage. In some embodiments, graphics unit 150 is configured to perform tile-based deferred rendering (TBDR). In tile-based rendering, different portions of the screen space (e.g., squares or rectangles of pixels) may be processed separately. Memory interface 180 may facilitate communications with one or more of various memory hierarchies in various embodiments.

As discussed above, graphics processors typically include specialized circuitry configured to perform certain graphics processing operations requested by a computing system. This may include fixed-function vertex processing circuitry, pixel processing circuitry, or texture sampling circuitry, for example. Graphics processors may also execute non-graphics compute tasks that may use GPU shader cores but may not use fixed-function graphics hardware. As one example, machine learning workloads (which may include inference, training, or both) are often assigned to GPUs because of their parallel processing capabilities. Thus, compute kernels executed by the GPU may include program instructions that specify machine learning tasks such as implementing neural network layers or other aspects of machine learning models to be executed by GPU shaders. In some scenarios, non-graphics workloads may also utilize specialized graphics circuitry, e.g., for a different purpose than originally intended.

Further, various circuitry and techniques discussed herein with reference to graphics processors may be implemented in other types of processors in other embodiments. Other types of processors may include general-purpose processors such as CPUs or machine learning or artificial intelligence accelerators with specialized parallel processing capabilities. These other types of processors may not be configured to execute graphics instructions or perform graphics operations. For example, other types of processors may not include fixed-function hardware that is included in typical GPUs. Machine learning accelerators may include specialized hardware for certain operations such as implementing neural network layers or other aspects of machine learning models. Speaking generally, there may be design tradeoffs between the memory requirements, computation capabilities, power consumption, and programmability of machine learning accelerators. Therefore, different implementations may focus on different performance goals. Developers may select from among multiple potential hardware targets for a given machine learning application, e.g., from among generic processors, GPUs, and different specialized machine learning accelerators.

Overview of Work Distribution and Logical Slots

Figure 2:
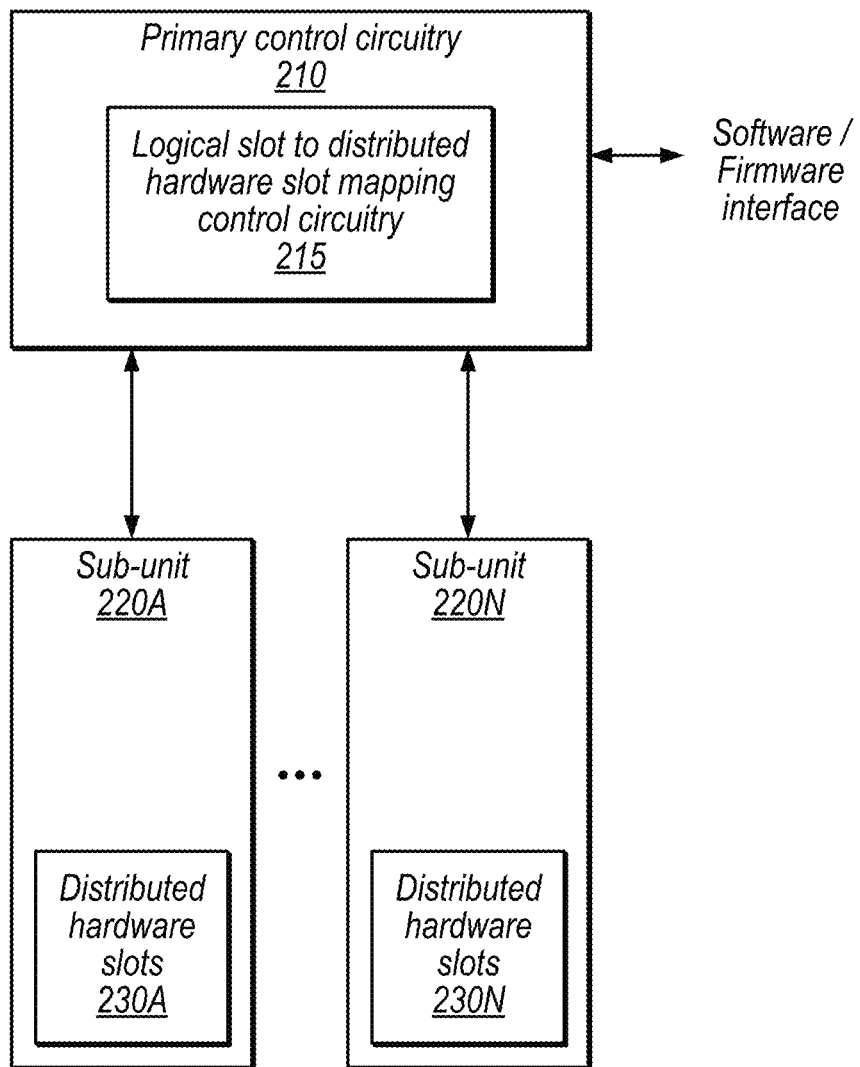
FIG. 2 is a block diagram illustrating example primary control circuitry configured to map logical slots to distributed hardware slots, according to some embodiments.

FIG. 2 is a block diagram illustrating example primary control circuitry and graphics processor sub-units, according to some embodiments. In the illustrated embodiment, a graphics processor includes primary control circuitry 210 and sub-units 220A-220N.

Primary control circuitry 210 may be a compute data master, vertex data master, or pixel data master, for example. Therefore, in some embodiments, a graphics processor includes multiple instances of primary control circuitry 210 which send different types of work to the same set of sub-units. Primary control circuitry 210 may receive kicks via an interface from software, firmware, or both. As used herein, the term "software" broadly refers to executable program instructions and encompasses firmware, operating systems, and third-party applications, for example. Therefore, it should be understood that various references to software herein may apply alternatively or additionally to firmware. Primary control circuitry 210, in the illustrated embodiment, includes logical slot to distributed hardware slot mapping control circuitry 215. Control circuitry 215 may distribute work from logical slots (which may be referred to as "kickslots") to distributed hardware slots on all or a portion of the graphics processor (e.g., according to different distribution modes discussed below with reference to FIG. 4).

Various circuitry is described herein as controlling logical slots. The term "logical" means that assignment of work to the logical slot does not imply which hardware that will actually execute the graphics instructions of the assigned work. The control circuitry may include hardware that maintains information for a logical slot and assigns work from the logical slot to hardware slots for actual execution. Thus, upon initial assignment to a logical slot, the hardware slots that will execute the set of work is not known. As discussed in detail below, logical slots may provide various advantages in terms of performance and power consumption when scheduling graphics work, particularly in a graphics processor with multiple shader cores.

Multiple "kicks" may be executed to render a frame of graphics data. In some embodiments, a kick is a unit of work from a single context that may include multiple threads to be executed (and may potentially include other types of graphics work that is not performed by a shader). A kick may not provide any assurances regarding memory synchronization among threads (other than specified by the threads themselves), concurrency among threads, or launch order among threads. In some embodiments, a kick may be identified as dependent on the results of another kick, which may allow memory synchronization without requiring hardware memory coherency support. Typically, graphics firmware or hardware programs configuration registers for each kick before sending the work to pipeline(s) for processing. Often, once a kick has started, it does not access a memory hierarchy past a certain level until the kick is finished (at which point results may be written to another level in the hierarchy). Information for a given kick may include state information, location of shader program(s) to execute, buffer information, location of texture data, available address spaces, etc. that are needed to complete the corresponding graphics operations. Graphics firmware or hardware may schedule kicks and detect an interrupt when a kick is complete, for example. In some embodiments, portions of a graphics unit are configured to work on a single kick at a time. As discussed in detail herein, tracking slots (also referred to as "top slots") and logical kickslots may be used to control kicks before assigning kicks to shader hardware. A kick may include a set of one or more rendering commands, which may include a command to draw procedural geometry, a command to set a shadow sampling method, a command to draw meshes, a command to retrieve a texture, a command to perform generation computation, etc. A kick may be executed at one of various stages during the rendering of a frame. Examples of rendering stages include, without limitation: camera rendering, light rendering, projection, texturing, fragment shading, etc. Kicks may be scheduled for compute work, vertex work, or pixel work, for example.

Sub-units 220, in some embodiments, are scaling units that may be replicated to increase the processing capabilities of a GPU. Each GPU sub-unit 220 may be capable of independently processing instructions of a graphics program. Sub-units 220, in the illustrated embodiment, include circuitry that implements respective distributed hardware slots 230. These hardware slots may also be referred to herein as "dSlots." Each sub-unit may include multiple hardware slots 230. Sub-units may also be referred to herein as "mGPUs." In some embodiments, primary control circuitry 210 assigns work from a logical slot to at most one distributed hardware slot in each sub-unit 220. In some embodiments, each sub-unit includes fragment generator circuitry, shader core circuitry configured to execute shader programs, memory system circuitry (which may include one or more caches and a memory management unit), geometry processing circuitry, and distributed workload distribution circuitry (which may coordinate with primary control circuitry 210 to distribute work to shader pipelines).

Each distributed hardware slot may include various circuitry configured to process an assigned kick or portion thereof, including configuration registers, a work queue, circuitry configured to iterate through work in the queue (e.g., batches of compute workitems), circuitry to sequence context loads/stores, and work distribution tracking circuitry. Each sub-unit 220 may include multiple shaders that accept work from distributed slots in the sub-unit and use pipelines to execute the work. For example, each shader may include a queue for each distributed hardware slot and may select work from among the queues based on work priority.

In some embodiments, a given sub-unit 220 includes multiple programmable shaders 160 of FIG. 1.

As discussed in detail below, logical slot to distributed hardware slot mapping control circuitry 215 may distribute kicks across sub-units 220 based on various parameters, software control inputs, etc.

Figure 3:
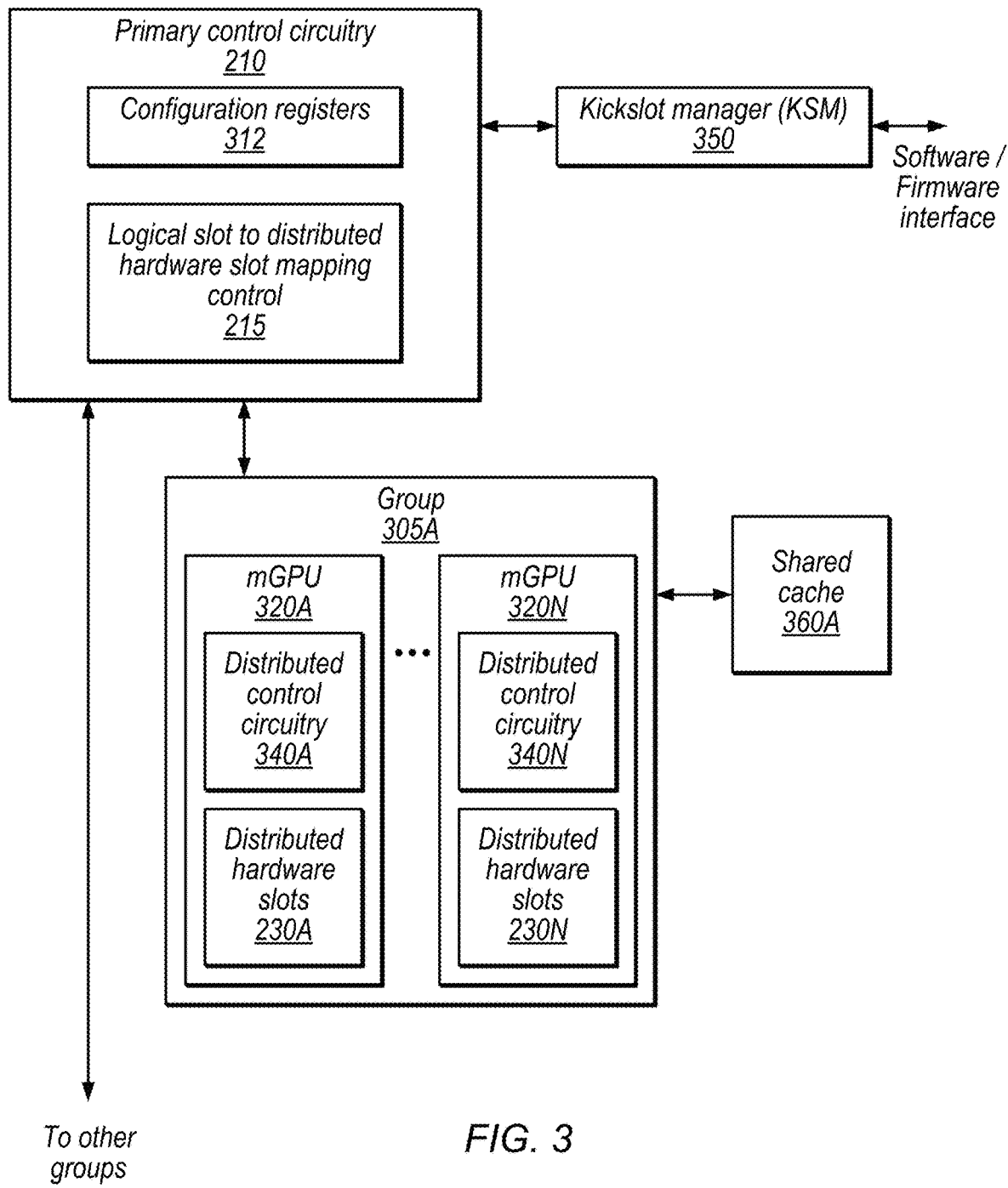
FIG. 3 is a block diagram illustrating primary control circuitry and example groups of GPU hardware sub-units, according to some embodiments.

FIG. 3 is a block diagram illustrating a more detailed example of primary control circuitry and grouped processor sub-units, according to some embodiments. In the illustrated embodiment, primary control circuitry 210 communicates with a kickslot manager (KSM) 350 and includes configuration registers 312. These configuration registers may include both setup and execution registers. Setup phase registers may be global structures that are agnostic of distributed hardware used to execute a kick while execute registers may be per sub-unit structures. Generally, although shown in primary control circuitry 210, configuration registers may be included in various appropriate circuitry (e.g., in distributed control circuitry 340) and may have different scopes (e.g., some registers may be boot scoped, some associated with a logical slot, and some associated with a distributed slot). Some configuration registers may be shared and program the same values into both global and per sub-unit register circuitry. Configuration registers data may be stored in memory in a defined format and retrieved and unpacked to populate physical configuration registers for a given kick.

In the illustrated embodiment, mGPUs 320A-320N are grouped and primary control circuitry 210 communicates with multiple such groups. mGPUs are an example of sub-units 220. Each group of mGPUs 305, in the illustrated embodiment, shares a cache 360. This may be a level 2 cache, e.g., in embodiments in which each mGPU 320 maintains a level 1 cache. This shared cache may be used to store instructions, data, or both. As discussed in detail below, scheduling work with data affinity properties to the same group 305 may be beneficial for cache efficiency. In some embodiments, each group of mGPUs 305 is implemented on the same die or semiconductor substrate, e.g., in multi-die implementations.

Each mGPU 320, in the illustrated embodiment, includes distributed control circuitry which may receive work from primary control circuitry 210, assign work within the mGPU, and report work completion back to primary control circuitry 210 (e.g., via a communications fabric). Signals assigning work may not include the actual instruction to perform or data to be operated on, but may identify the location of program instructions to be executed.

Kickslot manager 350, in the illustrated embodiment, is configured to receive kicks from the software/firmware interface and communicate kicks to primary control circuitry 210 for assignment to logical slots. Example communications between kickslot manager 350 and control circuitry are discussed in detail below with reference to FIG. 6 and a detailed example embodiment of kickslot manager 350 is discussed below with reference to FIG. 19.

Figure 4:
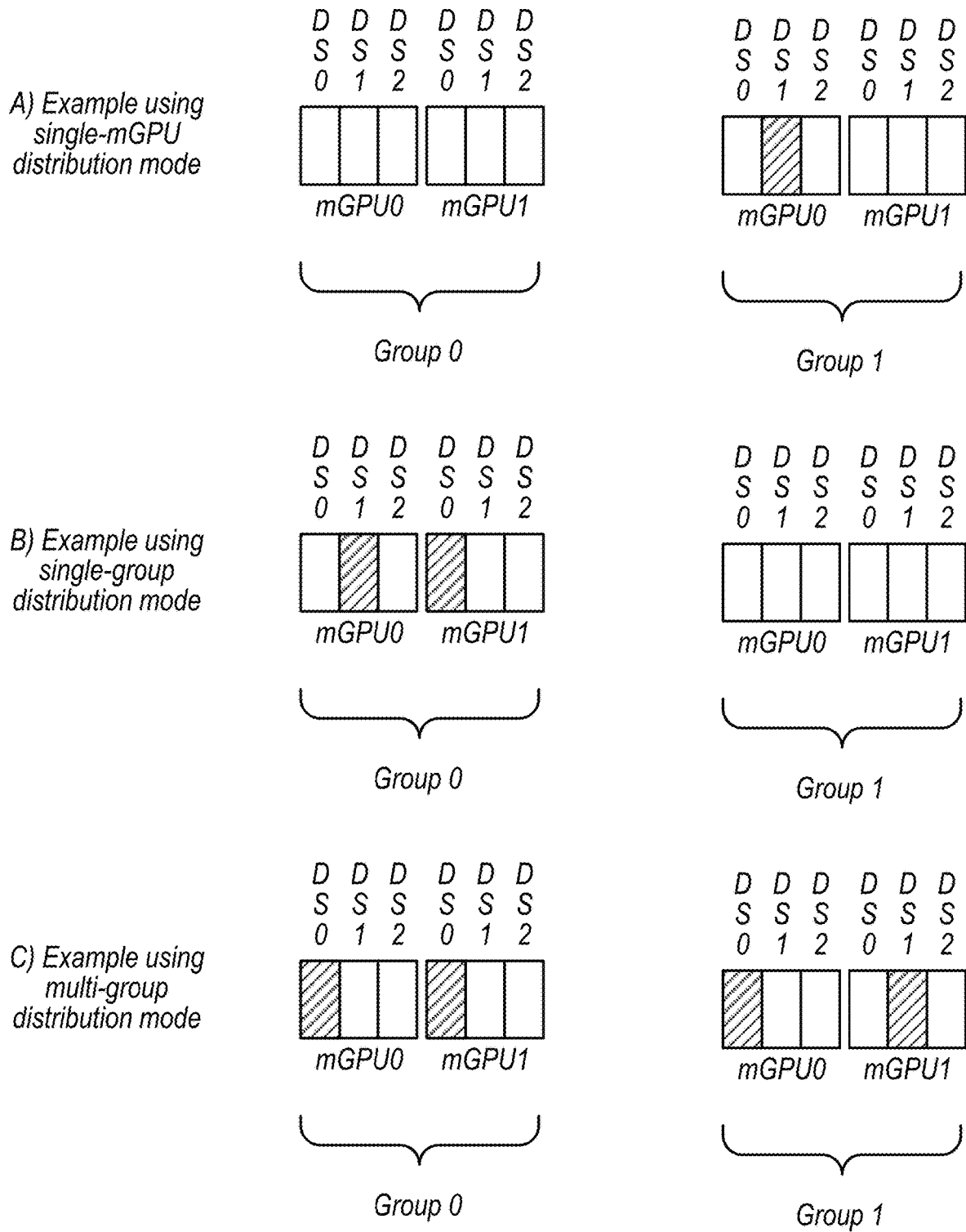
FIG. 4 is a diagram illustrating three example distribution modes for mapping logical slots to distributed hardware slots, according to some embodiments.
Figure 5:
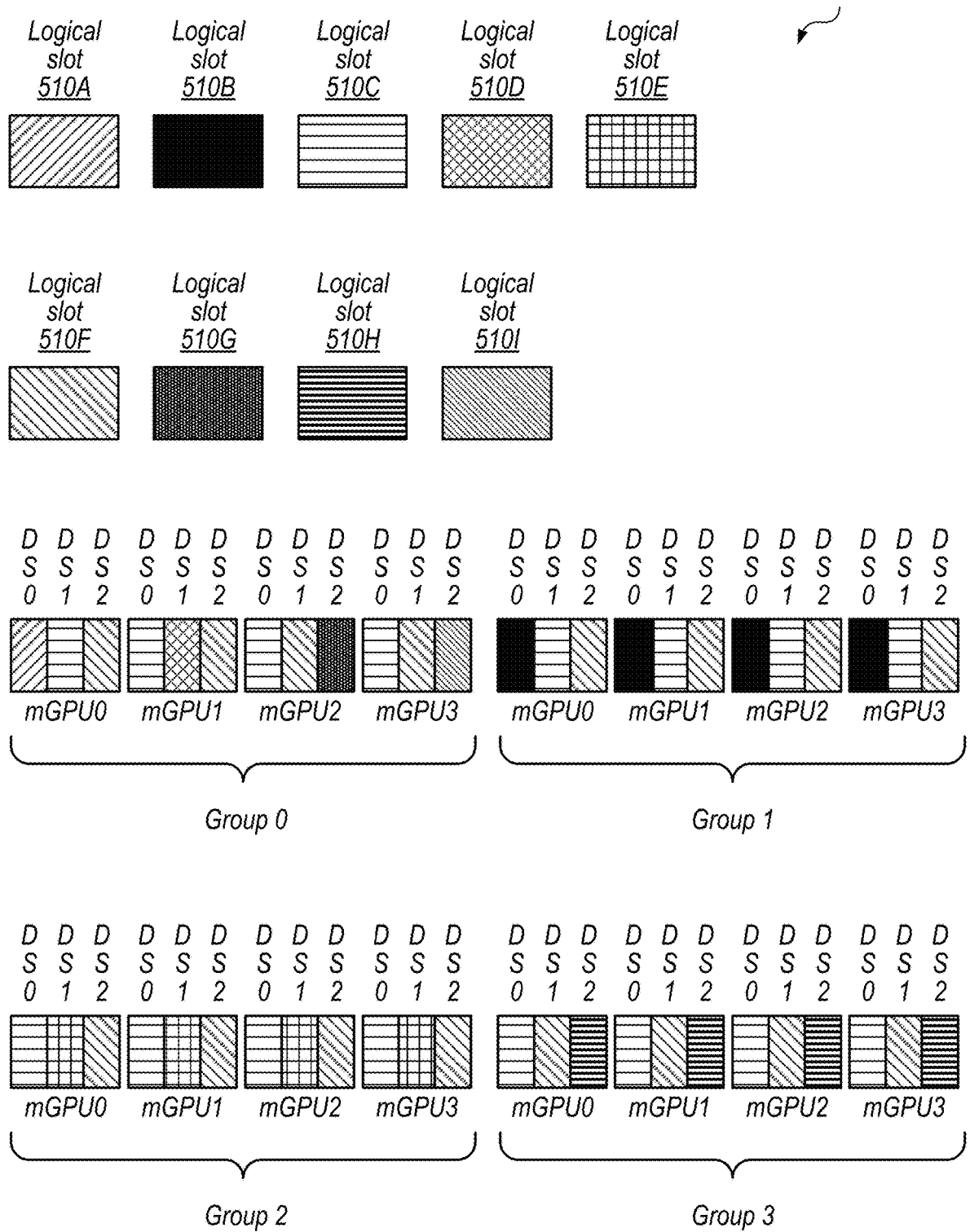
FIG. 5 is a diagram illustrating an example mapping of multiple logical slots to distributed hardware using different distribution modes, according to some embodiments.

FIGS. 4 and 5, discussed in detail below, provide examples of techniques implemented by embodiments of control circuitry 215 to distribute work from logical slots, according to some embodiments.

FIG. 4 is a diagram illustrating three example distribution modes, according to some embodiments. Generally, the distribution modes indicate breadth of distribution. In the illustrated examples, each mGPU implements three distributed hardware slots (DS0-DS2) and two groups (group 0 and group 1) each include two mGPUs (mGPU0 and mGPU1). Note that various numbers of hardware slots per mGPU, mGPUs per group, and groups per graphics processor may be implemented in various embodiments. Embodiments with different specific example numbers of elements are discussed herein for purposes of explanation, but these examples are not intended to limit the scope of the present disclosure.

As discussed above, in all three example modes, a logical slot is allowed to occupy at most one hardware slot of a given mGPU. Hardware slots to which work from a logical slot is distributed are shown using diagonal shading in FIG. 4. Further note that control circuitry 215 may dynamically adjust logical to hardware slot mapping in certain situations. A logical slot distributes work to distributed control circuitry in mGPUs where it is assigned hardware slots. The distributed control circuitry may then distribute work to their shaders within an mGPU.

Mode A, in the illustrated example, is a single-mGPU distribution mode. In this mode, control circuitry 215 assigns work from the logical slot to a single hardware slot on a single mGPU.

Mode B, in the illustrated example, is a single-group distribution mode. In this mode, control circuitry 215 assigns work from the logical slot to a slot on each mGPU in a group of mGPUs (group 0 in this example).

Mode C, in the illustrated example, is a larger multi-group distribution mode. In this mode, control circuitry 215 assigns work from the logical slot to a slot in each mGPU of multiple groups of mGPUs (e.g., every group on the graphics processor, in some embodiments).

Control circuitry 215 may determine the distribution mode for a logical slot (or a portion a kick assigned to a logical slot, e.g., for a kernel) based on various considerations discussed in detail below. Generally, control circuitry 215 may select a distribution mode based on the amount of work that primary control circuitry is managing at a particular time, based on a size of the set of work, or both. Further, software override functionality may allow software or firmware to adjust distribution of work in a kick. Still further, priority, dynamic remapping, and reclaim techniques may affect logical to hardware slot mappings.

Control circuitry 215 may report hardware slot allocations and deallocations to kickslot manager 350, which may allow software or firmware to query information about the current logical slot mappings (e.g., the distribution mode, specific mappings, etc.).

Note that the group/mGPU/hardware slot levels of organization are included for purposes of explanation but are not intended to limit the scope of the present disclosure. In some embodiments, the "group" level of organization may be omitted, which may result in only two distribution modes: single-mGPU or multiple-mGPU. In some embodiments, additional levels of organization may be implemented, which may be associated with additional distribution modes (e.g., a group of groups, which may result in a single-group-of-groups mode and a multiple-group-of-groups mode, in addition to single-mGPU mode and single-group mode).

FIG. 5 is a diagram illustrating example filling of available hardware slots from multiple logical slots, according to some embodiments. In the illustrated example, control circuitry 215 maps nine logical slots 510A-510I to forty-eight distributed slots (in four groups of four mGPUs) using multiple distribution modes.

In the illustrated example, circuitry 215 uses a single-mGPU distribution mode for logical slots 510A, 510D, 510G, and 510I. For example, logical slot 510A receives a single distributed slot DS0 in mGPU 0 of group 0.

Circuitry 215 uses a single-group distribution mode for logical slots 510B, 510E, and 510H. For example, logical slot 510B receives distributed slot DS0 on each mGPU of group 1.

Circuitry 215 uses a multiple-group distribution mode for logical slots 510C and 510F. For example, logical slot 510C receives a distributed slot on each illustrated mGPU.

Note that all hardware slots may not be assigned at all times, but generally, filling available slots may improve performance. When a kick assigned to a logical slot has completed, another kick may be assigned to that logical slot and the logical slot may be remapped to physical slots.

Example Control Circuitry

Figure 6:
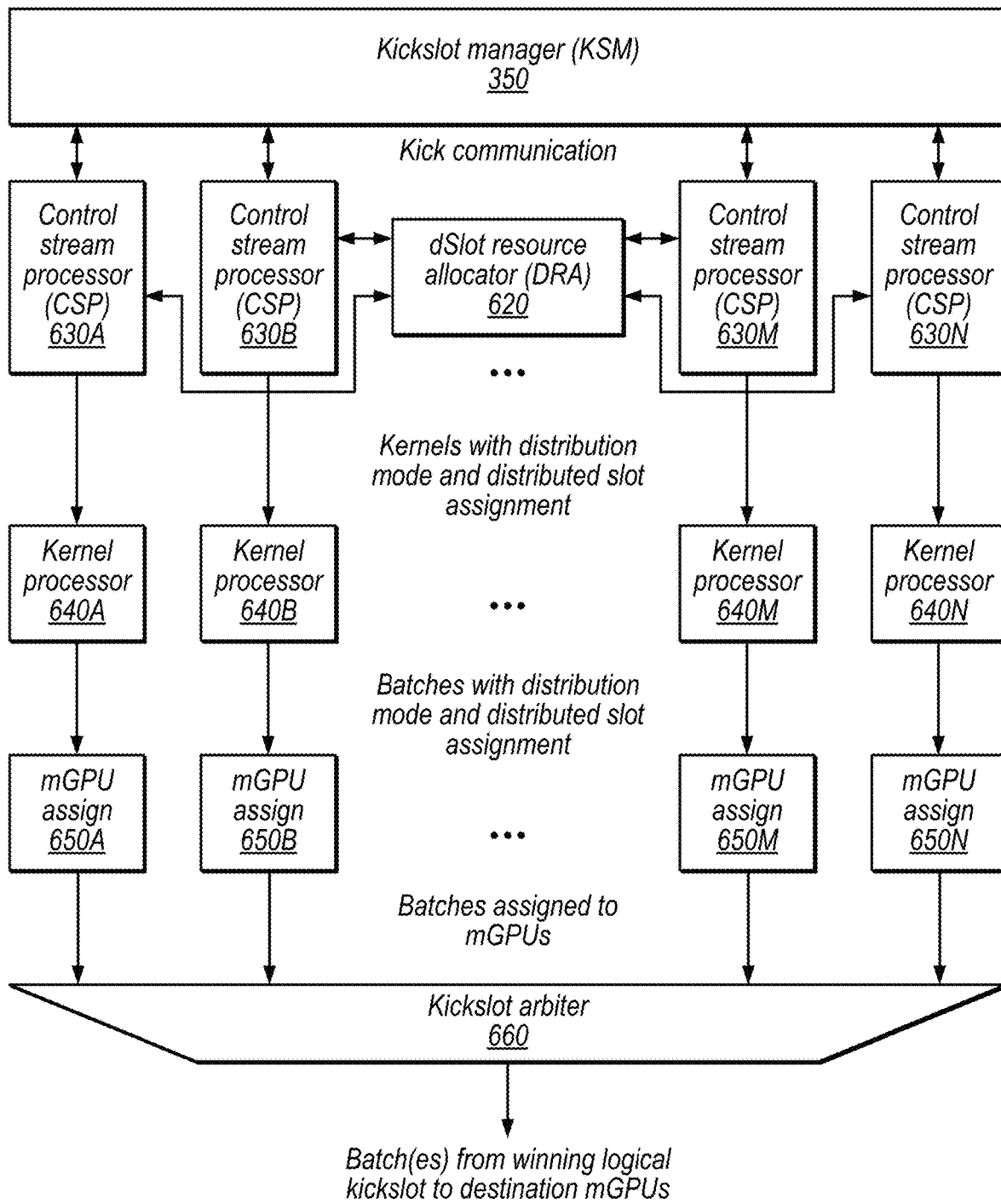
FIG. 6 is a block diagram illustrating detailed example elements of primary control circuitry, according to some embodiments.

FIG. 6 is a block diagram illustrating detailed example control circuitry, according to some embodiments. In the illustrated embodiment, kickslot manager communicates with mapping control circuitry 215, which includes, in the illustrated embodiment: dSlot resource allocator 620, control stream processors (CSPs) 630A-630N, kernel processor 640A-640N, mGPU assign circuitry 650A-650N, and kickslot arbiter 660. In some embodiments, each logical slot supported by the processor has an assigned set of elements 630, 640, and 650. Note that while certain details of FIG. 6 are relevant to compute work, similar techniques may be used for other types of work such as vertex and pixel shading.

Kickslot manager 350, in the illustrated embodiment, assigns kicks to logical slots and sends kick information to the corresponding control stream processor 630. The control stream processor 630 may inform kickslot manager 350 when the kick has completed processing.

Control stream processors 630, in the illustrated embodiment, manage sequencing of their kickslot, fetch and execute the control stream for a kick, and track kick completion. Control stream processors 630 may operate at kernel granularity (kernels may be fetched from the control stream for a kick). Control stream processors 630 may communicate with dSlot resource allocator 620 to obtain dSlot resources for their logical slot. Control stream processors 630 are configured to determine the distribution mode for kernels and send kernels with their distribution mode and distributed slot assignments to kernel processors 640.

dSlot resource allocator 620, in some embodiments, includes circuitry configured to receive requests from multiple logical slots and process the requests to assign dSlots to kernels. In some embodiments, dSlot resource allocator 620 selects a distribution mode and assigns dSlots for portions of a kick (e.g., at kernel granularity), although other granularities are contemplated. In some embodiments, dSlot resource allocator 620 first assigns logical slots based on kick priority and then assigns based on kick age, as discussed in further detail below. For example, DRA 620 may reserve some distributed slots for kernels from kicks with a priority level greater than a threshold.

Kernel processors 640, in the illustrated embodiment, are included in a primary compute data master. Kernel processors 640 are configured to create batches of workgroups from kernels and send batches with their distribution mode and distributed slot assignment to mGPU assign circuitry 650. Kernel processors 640 may select batches for distribution based on affinity, load balancing, or both, as discussed in detail below. Kernel processors 640 may receive an indication of assigned dSlots and a target mask which indicates which mGPUs are allowed to be targeted by the kernel.

As used herein, the term "compute kernel" in the graphics context is intended to be interpreted according to its well-understood meaning, which includes a routine compiled for acceleration hardware such as a graphics processor. Kernels may be specified by a separate program language such as OpenCL C, may be written as compute shaders in a shading language such as OpenGL, or embedded in application code in a high level language, for example. Compute kernels typically include a number of workgroups which in turn include a number of workitems (also referred to as threads). Note that various techniques discussed herein with reference to compute kernels may be applied to other types of work such as vertex or pixel processing tasks.

mGPU assign circuitry 650, in the illustrated embodiment, receives batches and sends batches to target mGPUs. Circuitry 650 may receive a batch along with a mask of allowable mGPU targets, which may be a function of the distribution mode. Using that mask, circuitry 650 may select an mGPU target based on load balancing.

Kickslot arbiter 660, in the illustrated embodiment, selects from among available batches to send to destination mGPUs. For example, kickslot arbiter 660 may select one or more logical kickslots to send a batch each cycle. The selected batches (and returning information associated with execution status) may be transmitted via a communications fabric. The fabric may be dedicated to control signaling, e.g., as discussed in U.S. patent application Ser. No. 17/158,943, filed Jan. 26, 2021 and titled "Shared Control Bus for Graphics Processors."

Various additional functionality performed by the circuitry of FIG. 6 is discussed in detail below, e.g., in sections that discuss specific functionality such as dynamic mapping, software overrides, priority, retain techniques, reclaim techniques, cache flushing, and affinity.

Per-Kernel Mapping Techniques

In some embodiments, per-kernel mapping during execution a compute kick may provide dynamic allocation that would be difficult at kick granularity (it may be difficult to determine how many distributed slots a kick should occupy before executing the kick). As briefly discussed above, the control stream processors 630 and dSlot resource allocator 620 may facilitate these techniques.

FIG. 7 is a diagram illustrating example distributed slot states and kernel residency information, according to some embodiments. This information may facilitate dynamic mapping.

The dslot_status, in the illustrated example, is maintained for each dSlot and indicates whether the dSlot is invalid, running, emptied, flushing, or retained. The invalid state indicates that the dSlot is not owned by any logical slot. The running state indicates that the dSlot is owned by a logical slot and is currently executing. The emptied state indicates that the dSlot is owned by a logical slot and is finished executing. The flushing state indicates that the dSlot is owned by a logical slot as is in the process of a cache flush (e.g., a flush-invalidate with the memory hierarchy). The retained state indicates that the dSlot is owned by a logical slot and is being retained after completion of a kernel (e.g., after an end-of-kernel cache flush invalidate), e.g., to preserve performance data. Note that these states are included for purposes of explanation but other states may be implemented, states may be omitted, or both, in other embodiments.

The dslot_owner state, in the illustrated example, is maintained for each dSlot and indicates the logical slot that owns the dSlot. This field is not relevant for the invalid state because no logical slot owns an invalid dSlot.

The per_kernel_residency state, in the illustrated example, is maintained for each kernel and each mGPU and indicates whether the kernel was assigned to the mGPU. Note that various information maintained per-kernel for compute work may similarly be maintained for kicks or portions of kicks for other types of work that does not utilize kernels.

Figure 8:
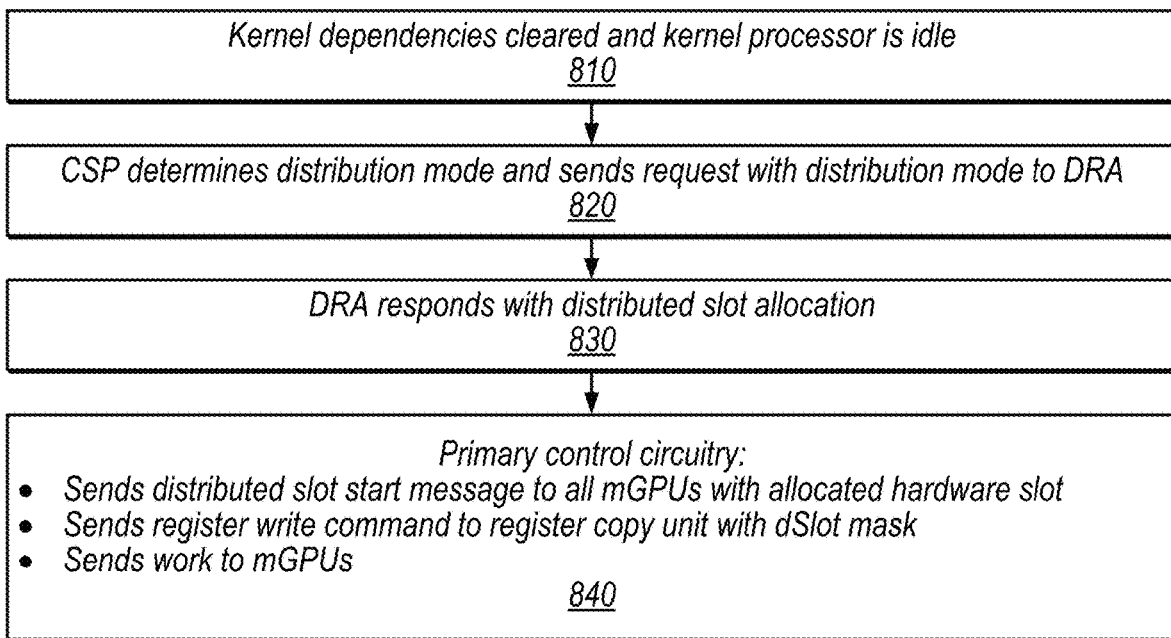
FIG. 8 is a flow diagram illustrating an example method for mapping logical slots to distributed mGPU hardware slots, according to some embodiments.

FIG. 8 is a flow diagram illustrating an example method for mapping kernels of a kick, according to some embodiments.

At 810, in the illustrated embodiment, the control circuitry waits until kernel dependencies have cleared and the logical slot assigned to the kick has an idle kernel processor. This allows the preceding kernel to finish iterating before beginning the next kernel for the kick.

At 820, in the illustrated embodiment, the CSP determines a distribution mode and sends a request with the distribution mode to the DRA 620.

At 830, the DRA 620 responds with a distributed slot allocation. Example DRA arbitration algorithms are discussed in detail below.

At 840, in the illustrated example, the primary control circuitry performs several activities. First, it sends a distributed slot start message to all mGPUs on which a dSlot was allocated for the kernel. Next, it sends a register write command to a register copy unit that includes a dSlot mask to indicate which dSlots are affected. The register copy unit writes distributed-slot-scoped control registers for the kernel. (The register copy unit may already have written logical-slot-scoped control registers for the kick.) Finally, the primary control circuitry sends work to the indicated mGPUs. Note that the work may be fenced until all register writes by the register copy unit are complete.

The primary control circuitry may also track completion status for every kernel that it distributes. For example, it may detect when the dSlots on which a kernel was executing have all transitioned from running to emptied.

Example Software Override Techniques

In some embodiments, software may provide various indications to override the default distribution mode for a kernel. This may allow software to parallelize important work rather than risk it being assigned to a single mGPU, for example. Further, this may allow software to assign a kernel to a specific group of mGPUs.

FIG. 9 is a diagram illustrating example software override fields. Software or firmware may adjust these fields to control kernel distribution. The mGPU mask field, in the illustrated embodiment, indicates which mGPUs can be used by this kick. For example, the mask may include a bit per mGPU. This may allow software to indicate that avoid or target certain mGPUs for the kick. The distribution mode field allows software to select a distribution mode. The default value may allow the control stream processor 630 for the logical slot to select a distribution mode. The other values may specify a distribution mode, which may be implemented by a control stream processor 630 regardless of the mode it would have chosen (at least in operating modes in which software overrides are enabled). In the default mode, the mGPU assign circuitry 650 may select dSlots according to the distribution mode selected by a CSP flexibly, based on load balancing, while in other modes the mGPU assign circuitry may follow restrictions specified by software overrides.

The force group field allows software to select a group on which to execute a kick. This may be specified in conjunction with single mGPU or single group distribution modes, for example. The policy field allows software to specify a scheduling policy for single mGPU or single group distribution. In the illustrated example, software can specify a "select first option" policy (which may be the default) or a round robin policy. The select first option policy may select the first available element (e.g., mGPU or group) according to their index, which may avoid fragmentation and leave more contiguous dSlots free for other slices. The round robin policy may randomize usage of resources which may avoid the location of selected resources causing substantial performance variation but may spread small slices over multiple groups. In other embodiments, various policies may be specified. Detailed examples of arbitration that considers software override fields are discussed below.

Example Arbitration Techniques

Figure 10C:
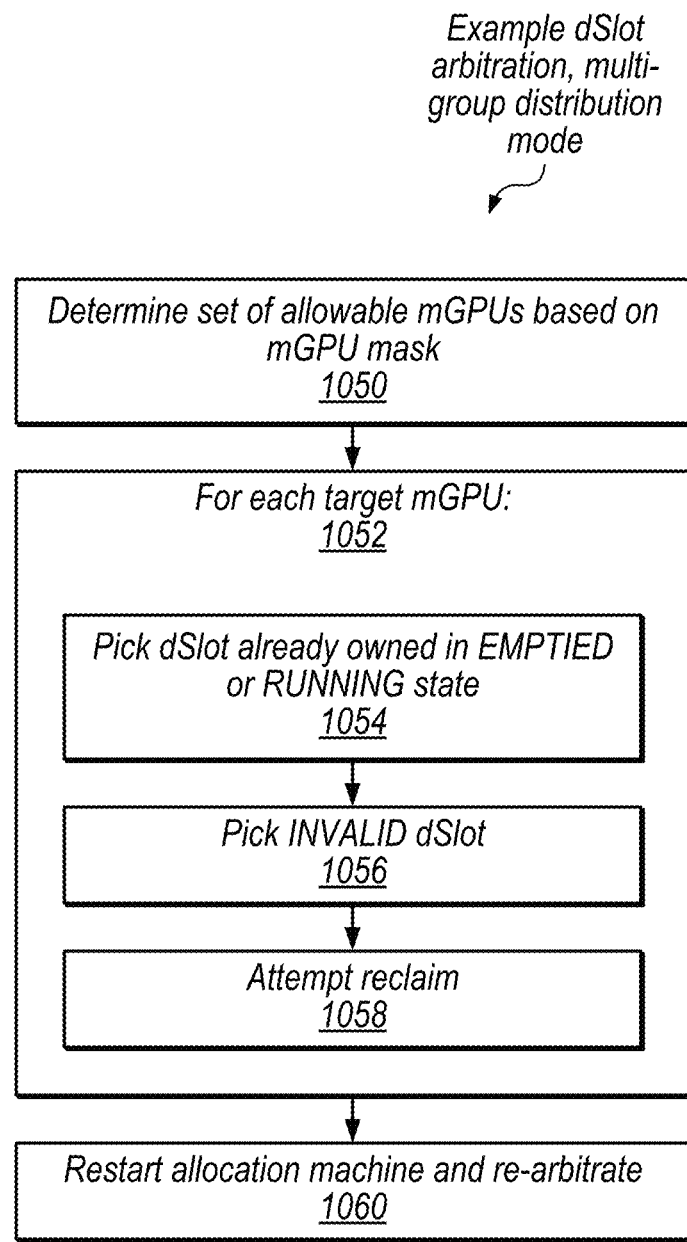

FIGS. 10A-10C are flow diagrams illustrating example techniques for hardware slot arbitration for respective different distribution modes, according to some embodiments. Note that disclosed techniques may generally distribute successive kernels in the same logical slot widely (e.g., such that if kernel A is a single-mGPU kernel that is allocated a dSlot in mGPU0, then kernel B that is also a single-mGPU kernel would be assigned to a dSlot in mGPU1, which may prioritize completing execution of a logical slot while allowing fewer logical slots to run concurrently).

In some embodiments, DRA 620 leaves dSlots in the emptied state as long as possible, e.g., to allow a subsequent kernel from the same logical slot to use the dSlot(s). This may reduce cache-flush invalidates and writing of execution configuration registers for newly allocated dSlots. In some embodiments, dSlots in the emptied state that are owned by another logical slot must go through a reclaim process (discussed below with reference to FIG. 11) and transition to invalid before being assigned to a new logical slot.

Generally, as described in detail below, DRA 620 uses the following priority scheme to select a dSlot for a kernel. Highest priority are emptied dSlots already owned by the logical slot. These dSlots have their control registers written and are free for immediate execution. Middle priority are invalid dSlots, which are newly allocated and may need control register writes, but are free for immediate execution. Lowest priority are running dSlots that are already owned by the distributed slot. These dSlots have their control registers written but may require waiting behind another kernel.

FIG. 10A shows an arbitration method for a single-mGPU distribution mode. At 1010, in the illustrated embodiment, DRA 620 determines a set of allowable mGPUs for a kernel based on its force group and mGPU mask fields. This set may omit any groups of mGPUs that are not selected by software.

At 1012, in the illustrated embodiment, DRA 620 picks an mGPU where the logical slot of the kernel already owns a dSlot in the emptied state. Note that in the case of a tie for elements 1012, 1016, and 1018, DRA 620 uses the determined policy (e.g., default, software-specified, or a single type of policy in some embodiments) to select hardware resources. For example, if there are multiple mGPUs that satisfy element 1012, DRA 620 may apply the policy to select an mGPU. If one or more mGPUs satisfy these criteria, one of them is selected and arbitration ends for that logical slot until the kernel is finished. Otherwise, flow proceeds.

At 1014, in the illustrated embodiment, DRA 620 picks an mGPU with at least one INVALID dSlot where the logical slot does not already own a dSlot. If one or more mGPUs satisfy these criteria, one of them is selected and arbitration ends for that logical slot until the kernel is finished. Otherwise, flow proceeds.

At 1016, in the illustrated embodiment, DRA 620 picks an mGPU with the most invalid slots. If one or more mGPUs satisfy these criteria, one of them is selected and arbitration ends for that logical slot until the kernel is finished. Otherwise, flow proceeds.

At 1018, in the illustrated embodiment, DRA 620 picks an mGPU where the logical slot already owns a hardware slot in the running state. If one or more mGPUs satisfy these criteria, one of them is selected and arbitration ends for that logical slot until the kernel is finished. Otherwise, flow proceeds.

At 1020, in the illustrated embodiment, DRA 620 attempts a reclaim procedure. Examples of such a procedure are discussed in further detail below with reference to FIG. 11. If reclaim is unsuccessful, flow proceeds.

At 1022, in the illustrated embodiment, DRA 620 restarts the allocation machine and re-arbitrates. For various distribution modes, re-arbitration may occur until a sufficient number of hardware slots are available to satisfy the distribution mode.

FIG. 10B shows an arbitration method for a single-group distribution mode. At 1030, in the illustrated embodiment, DRA 620 determines the set of allowable mGPUs, similarly to element 1010 of FIG. 10A.

At 1032, in the illustrated embodiment, DRA 620 picks a group where all mGPUs in the group have a dSlot owned by the logical slot of the kernel that is in an emptied or invalid state. In the case of a tie, DRA 620 picks the group with the least invalid dSlots. If one or more groups satisfy these criteria, one of them is selected and arbitration ends for that logical slot until the kernel is finished. Otherwise, flow proceeds.

At 1034, in the illustrated embodiment, DRA 620 picks a group where all mGPUs in the group have a dSlot owned by the logical slot that is in a running, invalid, or empty state. In the case of a tie, DRA 620 picks the group with the least mGPUs with a slot in the running state. DRA 620 may apply the policy if there is still a tie. If one or more groups satisfy these criteria, one of them is selected and arbitration ends for that logical slot until the kernel is finished. Otherwise, flow proceeds.

At 1038 and 1040, dRA 620 attempts reclaim and then restarts the allocation machine and re-arbitrates, similarly to elements 1020 and 1022 discussed above.

FIG. 10C shows an arbitration method for a multi-group distribution mode. At 1050, in the illustrated embodiment, DRA 620 determines the set of allowable mGPUs based on the mGPU mask (and not based on the force group command, as all groups are used in this example).

At 1052, in the illustrated embodiment, DRA 620 performs the operations of elements 1054-1058 for each target mGPU in the set of allowable mGPUs. At 1054, the DRA picks a dSlot that is already owned by the logical slot of the kernel that is in the emptied or running state. If one or more dSlots satisfy these criteria, one of them is selected and arbitration ends for that logical slot until the kernel is finished. Otherwise, flow proceeds.

At 1056, in the illustrated embodiment, the DRA 620 picks an invalid dSlot. If one or more dSlots satisfy these criteria, one of them is selected and arbitration ends for that logical slot until the kernel is finished. Otherwise, flow proceeds. At 1058, in the illustrated embodiment, DRA 620 attempts reclaim.

If the operations of element 1052 are not successful in allocating a dSlot in each mGPU for the kernel, flow proceeds to 1060 and DRA 620 restarts the allocation machine and re-arbitrates.

Note that while various techniques discussed above consider software override fields, in other embodiments software overrides may not be implemented or may be disabled in certain modes of operation. In that case, the DRA may operate as discussed above, but omitting software override considerations.

Slot Reclaim

In some embodiments, control circuitry is configured to allow a logical slot to reclaim a hardware slot that is assigned to another logical slot. In some embodiments, only higher-priority logical slots are allowed to reclaim hardware slots from other logical slots. Example techniques for enforcing logical slot priority are discussed below, but generally the priority may be indicated by software. In some embodiments, only hardware slots in the emptied state are eligible to be reclaimed by another logical slot.

Generally, control circuitry may attempt to keep a hardware slot in the emptied state as long as possible. This may avoid overhead of executing a cache flush-invalidate and writing configuration registers when switching the hardware slot to a new logical slot (because keeping the hardware slot in the emptied state may allow the same logical slot to send another kernel from the same kick to use the hardware slot, which avoids this overhead). Because of this, however, it may improve performance to allow other important logical slots to take such hardware slots.

FIG. 11A is a diagram illustrating example values of a hold signal used for hardware slot reclaim, according to some embodiments. The hold signal may also be referred to as a persistence signal. Each CSP 630 may send a hold signal to the DRA 620 indicating the extent to which it would like to hold onto its hardware slots (e.g., as a function of how far along the CSP 630 is in executing its kick).

In the illustrated example, the hold signal has one of three values, although other sets of values are contemplated in other embodiments. The low value indicates that the logical slot has reached a control stream terminate signal for the kick and that there are no kernels left in a kernel queue to process. In this case the logical slot will not require another hardware slot for the kick. The medium value indicates that the logical slot has not reached the control stream terminate, but that there are currently no kernels ready to request hardware slots for execution. The high value indicates that the logical slot has a kernel requesting hardware slots for execution.

In some embodiments, DRA 620 is configured to reclaim slots only if sufficient hardware slots can be reclaimed to satisfy the request. Otherwise, a reclaim attempt may fail. Once reclaim is successful, DRA 620 restarts its state machine and re-arbitrates the logical slot. DRA 620 may initiate a cache flush invalidate with the memory hierarchy for any reclaimed slots. This may transfer those slots to the flushing state, but those slots may become available for arbitration once they are finished flushing and transfer to the invalid state.

FIG. 11B is a flow diagram illustrating an example technique for reclaiming one or more hardware slots that are currently assigned to another logical slot, according to some embodiments. At 1110, in the illustrated embodiment, DRA 620 finds all dSlots in the flushing state. It may generate a data structure that indicates the set of dSlots in the flushing_set. If these dSlots are sufficient to service the request for a kernel, DRA 620 cancels the reclaim and waits for the flushes to finish. If not, flow proceeds.

At 1120, in the illustrated embodiment, DRA 620 finds all dSlots that are emptied and are owned by a logical slot that (a) is not context storing and (b) does not have any flushing dSlots. It may generate a data structure that indicates the set of dSlots in this allowed_set. If the dSlots in the allowed_set with a low hold value combined with the dSlots in the flushing_set and are sufficient to service the request, DRA 620 reclaims those dSlots and begins the cache flush invalidate for those dSlots. If not, flow proceeds.

At 1130, in the illustrated embodiment, DRA 620 first determines if the request is for a low or high priority logical slot and operates accordingly. Note that other granularities of priority may be supported in other embodiments. For a low-priority requestor, the DRA 620 generates a do_set of slots which are slots in allowed_set with a medium hold value that are owned by a low-priority logical slot. DRA 620 finds dSlots in both the flushing_set and do_set. If these dSlots are sufficient to service the request, DRA 620 reclaims those dSlots and begins the cache flush invalidate for those dSlots. If not, flow proceeds.

For a high-priority requestor, the DRA 620 generates a do_set of slots which are slots in allowed_set with a medium hold value that are owned by a high-priority logical slot. DRA 620 finds dSlots in both the flushing_set and do_set. If these dSlots are sufficient to service the request, DRA 620 reclaims those dSlots and begins the cache flush invalidate for those dSlots. If not, flow proceeds.

At 1140, in the illustrated embodiment, DRA 620 adds slots to the do_set that are in the allowed_set, have a high hold value, and belong to a logical slot with a lower priority and lower age. DRA 620 finds dSlots in both the flushing_set and updated do_set. If these dSlots are sufficient to service the request, DRA 620 reclaims those dSlots and begins the cache flush invalidate for those dSlots. If not, it may cancel reclaim and restart arbitration.

In various embodiments, disclosed techniques may advantageously provide a balance between keeping hardware slots emptied for the current logical slot (to avoid overhead) while still allowing those hardware slots to be reclaimed by other logical slots in certain scenarios.

Slot Retention

In some embodiments, control circuitry is configured to retain hardware slots for a logical slot until instructed to release the slots (e.g., by software). This may allow software to query various kick information such as performance registers, memory, or other data affected by kick execution. In some embodiments, each kick includes a retain_slots field (e.g., a bit) that indicates whether the hardware slots that become mapped for the logical slots should wait to be deallocated.

In some embodiments, if a kick with slots retained is assigned to a logical slot, other slots cannot reclaim resources from that logical slot, regardless of priority.

Figure 12:
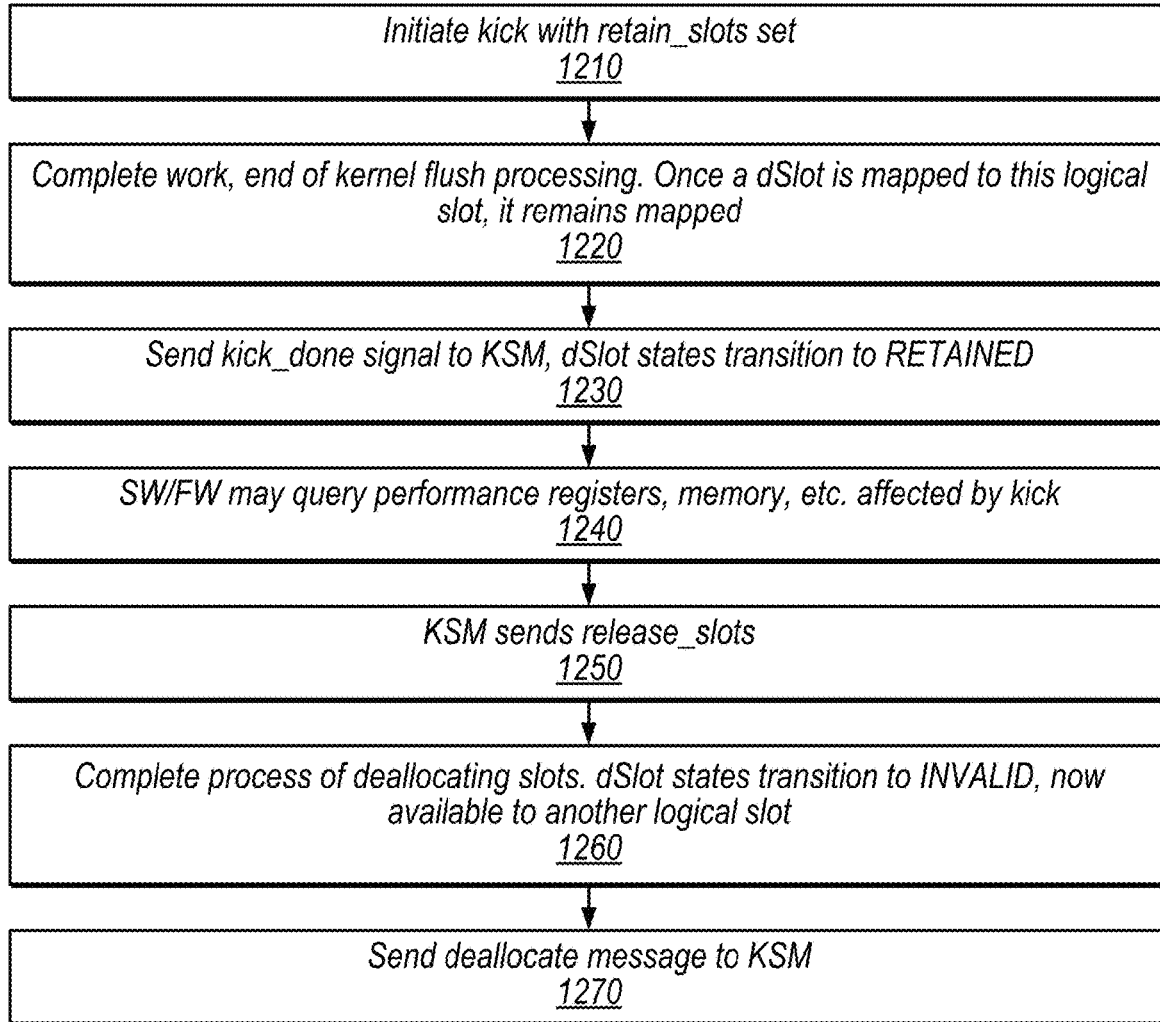
FIG. 12 is a flow diagram illustrating an example software-controlled hardware slot retention procedure, according to some embodiments.

FIG. 12 is a flow diagram illustrating an example method performed by primary control circuitry to process a kick with slots retained, according to some embodiments. The procedure may be performed in communication with KSM 350 in order to allow software communication. At 1210, in the illustrated example, primary control circuitry 210 initiates a kick with a retain_slots field set, indicating that slots hardware slots should be retained.

At 1220, in the illustrated example, the kick completes its work and the device performs end of kernel flush processing. The hardware slots remain mapped.

At 1230, the primary control circuitry 210 sends a kick_done signal to the KSM 350. It also transitions the dSlots to the retained state.

At 1240, software or firmware may query performance registers, memory, etc. affected by the kick. At 1250, KSM 350 sends a release_slots signal (e.g., based on a software instruction indicating that querying is complete).

At 1260, the primary control circuitry 210 completes the process of deallocating the hardware slots, which transition to the invalid state and are now available to another logical slot. At 1270, primary control circuitry 210 sends a deallocate message to KSM 350, informing it that deallocation is complete.

In some embodiments, to avoid hang conditions, kicks with slots maintained always use the multi-group distribution mode and cannot be blocked from completing. Therefore, when arbitrating between logical slots with retain and logical slots without retain, logical slots with retain may always have priority. Further, KSM 350 may only schedule up to a threshold number of logical slots with retain set, e.g., corresponding to the number of dSlots per mGPU. In some embodiments, all logical slots with retain set are promoted to high priority.

Reserved Slots for High-Priority Kicks

As briefly discussed above, different logical slots may have different priority levels, e.g., as specified by software. In some embodiments, on a given mGPU, a subset of hardware slots are reserved for logical slots that meets a threshold priority (e.g., higher priority slots in a system with two priority levels).

Figure 13:
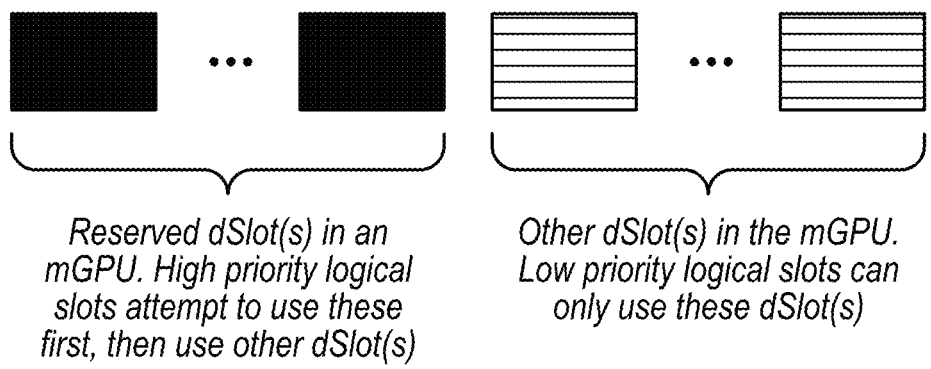
FIG. 13 is a diagram illustrating example reserved hardware slots in an mGPU for higher-priority logical slots, according to some embodiments.

FIG. 13 is a block diagram illustrating a number of hardware slots of an mGPU. In some embodiments, one or more dSlots (shown in solid black in FIG. 13) are reserved for high priority logical slots and one or more dSlots (shown with horizontal shading in FIG. 13) are available to all logical slots (and are the only hardware slots available to low-priority logical slots).

In some embodiments, high-priority logical slots attempt to use the reserved hardware slots of an mGPU first before attempting to use other slots. In other embodiments, high-priority logical slots may attempt to use all hardware slots of an mGPU equally, e.g., using round-robin techniques.

In some embodiments, low-priority logical slots are not allowed to reclaim hardware slots from high-priority logical slots unless there is no chance that a high-priority logical slot will use them.

In various embodiments, disclosed priority techniques may advantageously allow software to influence the distribution of important work to reduce impediments from less important work.

Flushing Techniques

As discussed above, a cache flush invalidate (CFI) may be performed each time a hardware slot is to be assigned to a new logical slot. Further, primary control circuitry 210 must execute any CFIs included in the control stream for compute kicks. Because hardware slots may be dynamically mapped at kernel level, however, the set of hardware slots to flush for a control stream CFI may not be deterministic. The discussion below provides techniques for handling this phenomenon. In particular, an "unconditional" CFI is introduced that flushes all relevant mGPUs (e.g., all mGPUs in the graphics processor in some implementations).

Figures 14A, 14B:
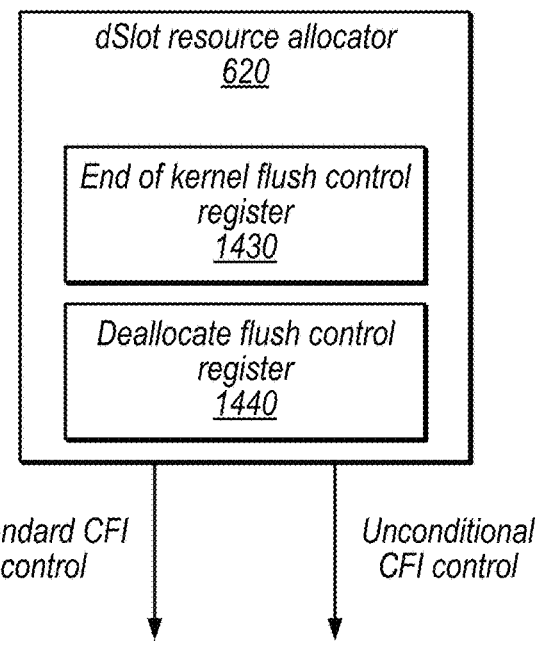
FIG. 14A illustrates an example cache flush invalidate command that encodes an unconditional field and FIG. 14B illustrates example flush control circuitry, according to some embodiments.

FIG. 14A is a diagram illustrating an example cache flush invalidate command with an unconditional field, according to some embodiments. Each CFI, in this example, includes an "unconditional" field. Standard (non-unconditional) CFIs apply to all hardware slots owned by a logical slot at the time the standard CFI is issued. Unconditional CFIs are sent to all mGPUs even if the logical slot did not own any hardware slots in some mGPUs.

FIG. 14B is a block diagram illustrating an embodiment of the dSlot resource allocator that is configured to process unconditional CFIs, according to some embodiments. In the illustrated example, DRA 620 includes an end of kernel flush control register 1330 and a deallocate flush control register 1340. In some embodiments, primary control circuitry 210 implements a state machine such that at most one unconditional CFI may be outstanding at any given time. The logical slots may arbitrate for this resource.

End of kernel flush control register 1330 may maintain a set of bits indicating which mGPUs to flush at the end of a kernel. Deallocate flush control register 1340 may maintain a set of bits indicating which mGPUs to flush upon dSlot deallocation in the middle of a kick (note that this may be a subset of bits specified by the end of kernel flush).

DRA 620 may implement the following procedure when a dSlot is deallocated. First, if the dSlot is not the last mGPU in the group with a dSlot allocated for the logical slot, DRA 620 uses the deallocate flush control register 1340, which may potentially flush-invalidate a smaller number of caches (e.g., one or more L1 caches and not an L2 cache shared by the group). If the dSlot is in the last mGPU of the group, DRA 620 uses the end of kernel flush control register 1330 to determine which cache(s) to flush.

In various embodiments, the disclosed techniques may advantageously avoid non-deterministic flushing behavior, improve cache efficiency, or both.

Affinity-Based Distribution

In embodiments in which multiple GPU sub-units share a cache (e.g., mGPUs 320A-320N of a group 305), control circuitry may schedule portions of a kernel that access the same memory region(s) to sub-units that share a cache. This may improve cache efficiency, particularly between kernels of the same kick.

In some embodiments, primary control circuitry 210 defines a set of affinity regions, which may correspond to sets of hardware that share resources such as a cache. In some embodiments, there is a fixed relationship between affinity regions and target groups of mGPUs (although the relationship may vary depending on the dimensionality of the kernel). Primary control circuitry 210 may include control registers that store a number of affinity maps. Each affinity map may specify relationships between kernel portions and affinity regions. In this manner, each kernel may refer to an affinity map that reflects its memory accesses (e.g., as determined and by software, which may configure affinity maps and specify an affinity map for each kernel).

Therefore, software may program potential affinity patterns using configuration registers, which may also be shared between multiple data masters. Within a kick, different kernels may be distributed according to different affinity maps.

Figure 15:
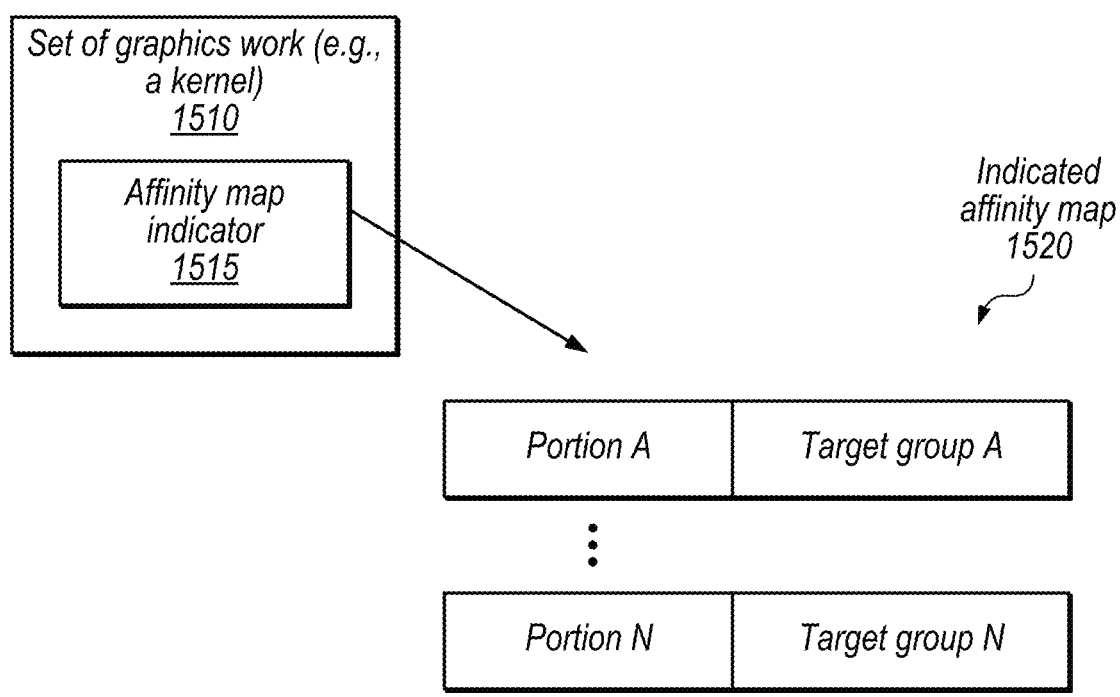
FIG. 15 is a block diagram illustrating an example affinity map indicated by a set of graphics work, according to some embodiments.

FIG. 15 is a diagram illustrating example affinity techniques for a set of graphics work (e.g., a compute kernel), according to some embodiments. In the illustrated embodiment, a set of graphics work (e.g., a kernel) includes an affinity map indicator 1515 that specifies an affinity map 1520. The indicator may be a pointer or an index into a table of affinity maps, for example. The affinity map indicates corresponding target groups 305 of mGPUs for N portions of the kernel. Note that the "portion" of the kernel may not actually be a field in the affinity map, but may be implied based on the index of an entry. For example, the third entry in the affinity map may correspond to the 3/Nth portion of the kernel. The device may include configuration registers configurable to specify multiple different affinity maps. Further, a given affinity map may be referenced by multiple kernels.

In some embodiments, rather than mapping portions of a set of graphics work directly to target groups, affinity maps may use an indirect mapping that maps portions of the set of graphics work to affinity regions and then maps affinity regions to sets of hardware (e.g., to groups of mGPUs).

Control circuitry may distribute the set of graphics work based on the indicated affinity map. Multiple portions of the set of graphics work 1510 that target the same group may be assigned to the same group/affinity region (and thus may share a cache shared by mGPUs of the group, which may improve caching efficiency).

Note that although disclosed embodiments specify affinity at the granularity of groups of mGPUs, affinity may be specified and implemented at any of various appropriate granularities, e.g., with shared caches at various levels in a memory hierarchy. The disclosed embodiments are included for purposes of illustration but are not intended to limit the scope of the present disclosure.

Figure 16:
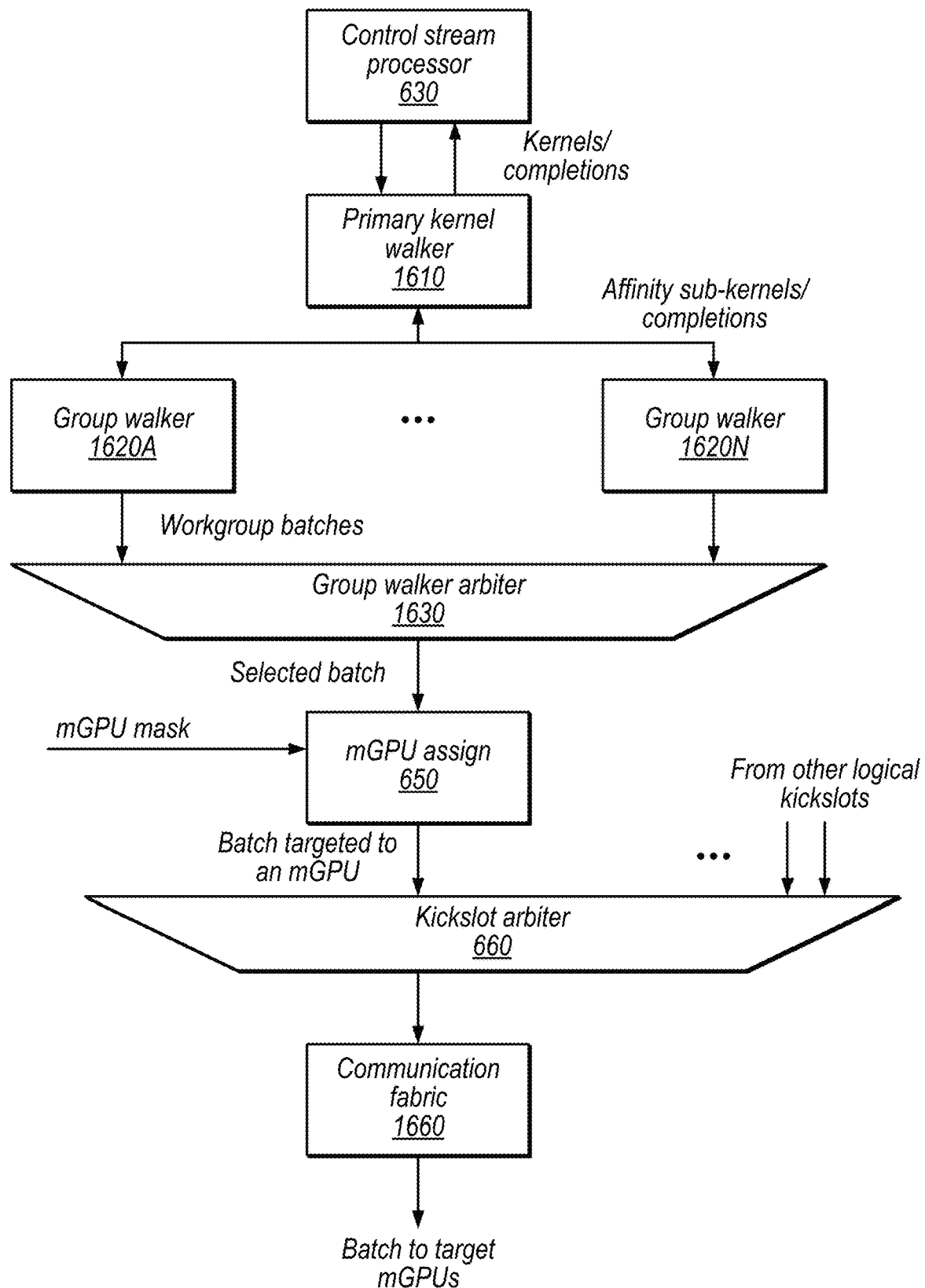
FIG. 16 is a block diagram illustrating example kernel walker circuitry for affinity-based scheduling, according to some embodiments.

FIG. 16 is a block diagram illustrating example circuitry configured to distribute batches of workgroups from kernels based on affinity, according to some embodiments. In the illustrated embodiment, control circuitry for one logical slot includes: control stream processor 630, primary kernel walker 1610, group walkers 1620A-1620N, group walker arbiter 1630, mGPU assign circuitry 650, kickslot arbiter 660, and communications fabric 1660. Similar circuitry may be instantiated for each logical slot supported by the device. Note that elements 1610, 1630, and 1640 may be included in a kernel processor 640 discussed above and that similarly-numbered elements may be configured as described above with reference to FIG. 6.

Each kernel may be organized into workgroups in multiple dimensions (typically three dimensions). These workgroups may in turn include multiple threads (also referred to as workitems). Primary kernel walker 1610, in the illustrated embodiment, is configured to iterate through the kernel to provide affinity sub-kernels, which include portions of the kernel that target the group of mGPUs, according to the specified affinity map. Primary kernel walker 1610 may indicate the sub-kernel assigned to a given group walker 1620 using the coordinates of the initial workgroup of the sub-kernel. Note that the various kernel data sent between elements of FIG. 16 may not include actual work, but rather may be control signaling that indicates the location of work to be assigned, e.g., using coordinates with a kernel.

For kernels with different dimensionalities, the primary kernel walker 1610 may divide the kernel into N affinity regions. For example, in embodiments with N affinity regions per affinity map, the primary kernel walker 1610 may use all N regions for a single-dimensional kernel. For a two-dimensional kernel, primary kernel walker 1610 may divide the kernel into a $\sqrt{N}$ by $\sqrt{N}$ grid of affinity regions. For a three-dimensional kernel, primary kernel walker 1610 may divide the kernel into rectangular affinity regions (as one example, a $\sqrt{N}$ by $\sqrt{N}$ grid of affinity regions that spans the entire z dimension).

Group walkers 1620, in the illustrated embodiment, are configured to independently walk respective affinity sub-kernels and generate batches, where each batch includes one or more workgroups. A batch may be the granularity at which compute work is dispatched to an mGPU. Note that a given affinity sub-kernel may be divided into multiple thread-restricted walk order sub-kernels, as discussed in detail below with reference to FIG. 17. Various techniques for controlling kernel walk order are discussed in U.S. patent application Ser. No. 17/018,913, filed Sep. 11, 2020 and may be used by group walkers 1620 to walk an affinity sub-kernel.

Group walker arbiter 1630, in the illustrated embodiment, is configured to arbitrate among available batches and mGPU assign circuitry 650 is configured to assign selected batches to mGPUs.

Assign circuitry 650 may use the mGPU mask and load balancing to assign mGPUs, subject to any software overrides. Kickslot arbiter 660 arbitrates among ready batches and sends them to target mGPUs via communications fabric 1660. Communications fabric 1660 may be a workload distribution shared bus (WDSB) configured to send control signaling that indicates properties of assigned work and tracking signaling to indicate work completion, e.g., as discussed in the '943 patent application referenced above.

In some embodiments, the device may turn affinity-based scheduling off, e.g., based on software control or using control circuitry under certain conditions. In this situation, primary kernel walker 1610 may assign the entire kernel to a single group walker 1620.

Each instance of distributed control circuitry 340 in mGPUs may include an input queue and a batch execution queue to store received batches before assigning workgroups to shader pipelines for execution.

Figure 17:
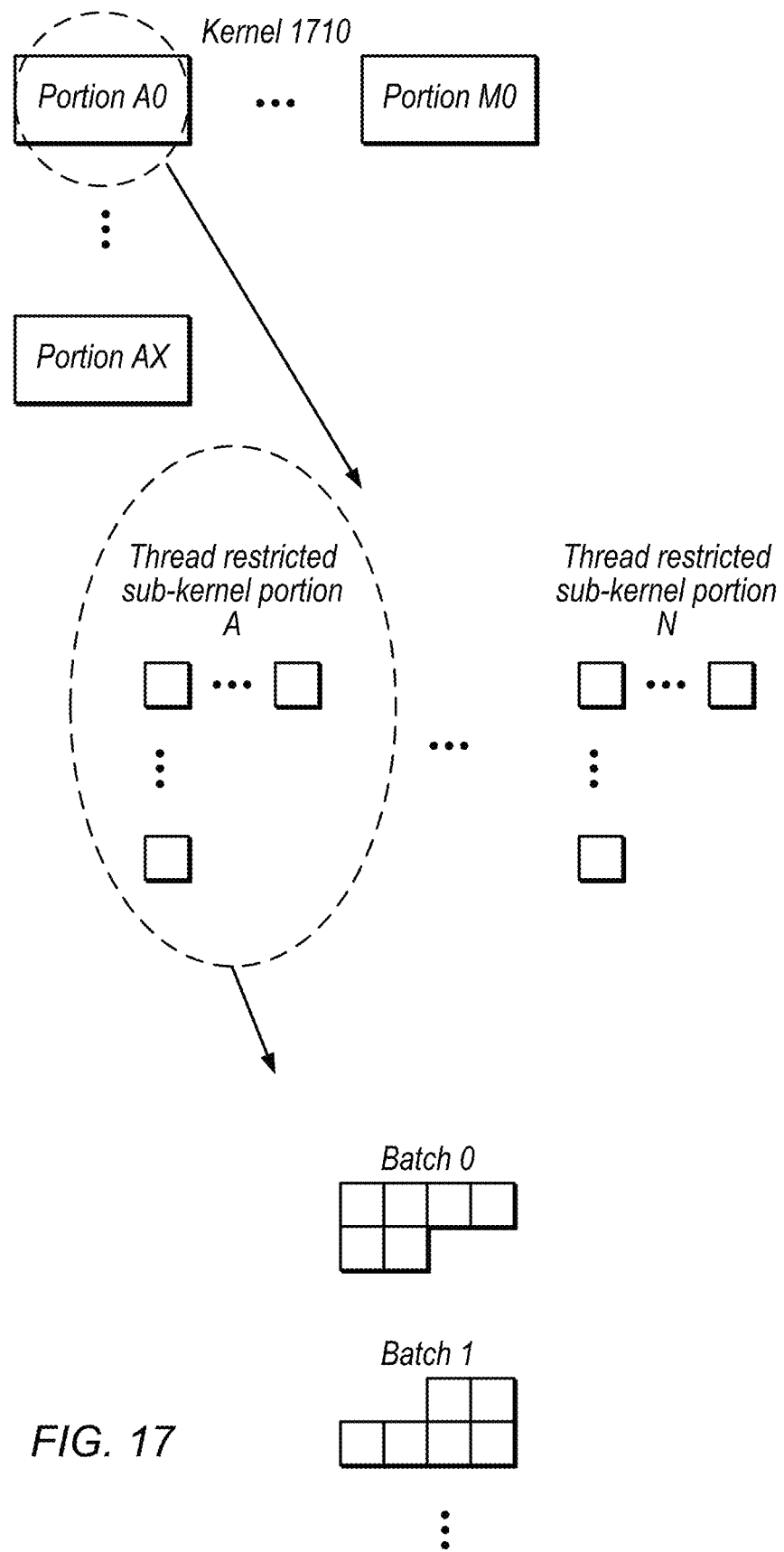
FIG. 17 is a diagram illustrating example iteration of a kernel based on software-indicated affinity, according to some embodiments.

FIG. 17 is a diagram illustrating example kernel iteration, according to some embodiments. In the illustrated embodiment, a kernel 1710 includes multiple portions (M portions in one dimension and X portions in another dimension). Each of these portions may be referred to as an affinity sub-kernel and may be mapped to an affinity region (note that multiple affinity sub-kernels may be mapped to the same affinity region).

In the illustrated example, portion A0 includes multiple thread restricted sub-kernel portions A-N. Within each affinity sub-kernel, a group walker 1620A may use restricted iteration as set out in the '913 application. As shown, thread restricted sub-kernel portion A is divided into a number of batches, which may be distributed via communication fabric 1660 (where each square in a batch represents a workgroup). In disclosed embodiments, all batches from portion A0 may be assigned to the same group of mGPUs (and note that other portions of kernel 1710 may also target this group of mGPUs). In various embodiments, the disclosed affinity techniques may advantageously improve cache efficiency.

In some embodiments, affinity-based scheduling may temporarily reduce performance in certain situations, e.g., for non-homogeneous kernels. For example, some groups of mGPUs may still be working on a complex portion of a kernel when other groups have finished less-complex portions. Therefore, in some embodiments, the graphics processor implements work stealing techniques to override affinity-based scheduling, e.g., at the end of a kernel. In these embodiments, groups of mGPUs that are idle for a kernel may take work from groups that are still working on the kernel, which may advantageously reduce overall execution time for the kernel.

In some embodiments, control circuitry selects one or more donator groups of mGPUs (e.g., the group(s) with the most work remaining) and selects other groups of mGPUs in certain states (e.g., that have completed all of their work for a kernel or at least a threshold amount of their work) as work recipient groups. The work recipient groups may receive batches from an affinity sub-kernel assigned to the donator group, thereby overriding affinity techniques in certain situations.

Figure 18:
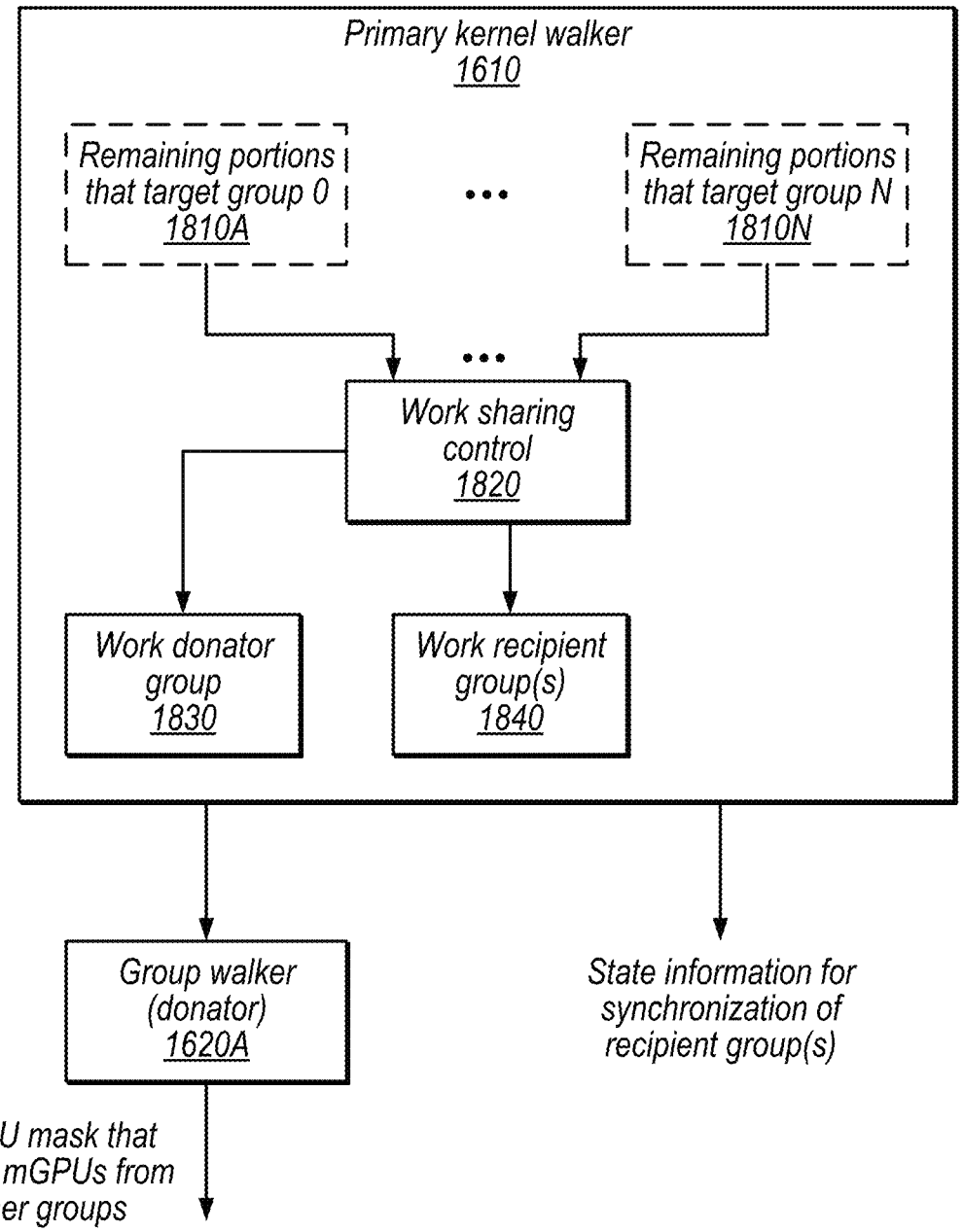
FIG. 18 is a block diagram illustrating example work sharing control circuitry, according to some embodiments.

FIG. 18 is a block diagram illustrating example circuitry configured to facilitate work sharing, according to some embodiments. In the illustrated embodiment, primary kernel walker 1610 includes circuitry 1810A-1810N configured to track the remaining portions of a kernel (e.g., affinity sub-kernels) that target each group of mGPUs. For example, if a given group was targeted by seven affinity sub-kernels and has received four affinity sub-kernels, three affinity sub-kernels are remaining for that group.

Work sharing control circuitry 1820, in the illustrated embodiment, is configured to select work donator group(s) and recipient group(s) based on the information maintained by circuitry 1810. Information identifying these groups is maintained in circuitry 1830 and 1840, in the illustrated embodiment. In some embodiments, a group is eligible to take work only if it was associated with an affinity region in a kernel's affinity map. In some embodiments, a group becomes eligible to take work for a kernel once it has dispatched all of its assigned work (assigned via the affinity map) for the kernel.

In some embodiments, the work donator group is the group that is furthest behind (has the greatest number of portions remaining to dispatch). When groups become eligible to receive work, they may lock on to the donator group. As shown, primary kernel walker 1610 may send state information (e.g., coordinate base information for an affinity sub-kernel) for synchronization of such recipient groups.

The group kernel walker for the donator (1620A, in this example) produces batches of workgroups to send to the mGPUs in its corresponding group or to the mGPUs of any of the work recipient groups. The set of eligible mGPUs may be specified by the mGPU mask from group walker 1620A, for example, such that mGPU assign circuitry 650 can select from among the set of eligible mGPUs based on load balancing.

In some embodiments, once the donator group is finished dispatching for its current portion (e.g., affinity sub-kernel) the recipients become unlocked and a new donator may be selected, and the process may continue until the entire kernel is dispatched.

Example Kickslot Manager Circuitry

Figure 19A:
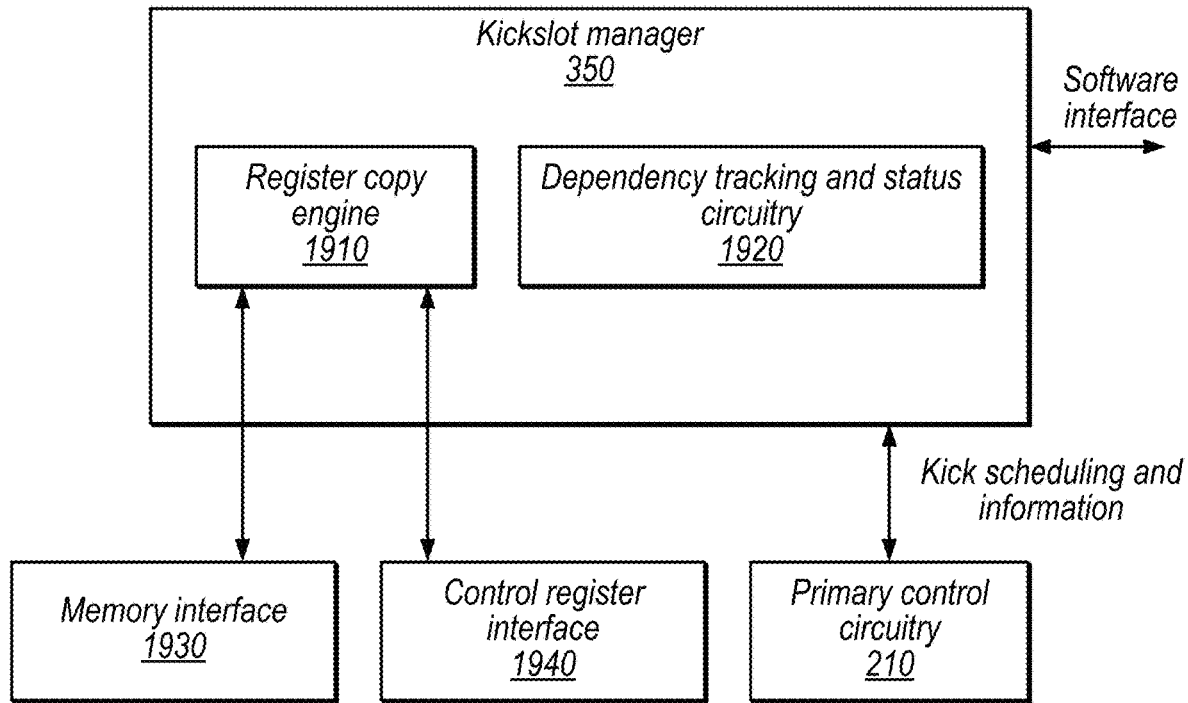
FIG. 19A is a block diagram illustrating an example logical slot manager with dependency tracking and status circuitry and FIG. 19B illustrates example tracking and status fields, according to some embodiments.

FIG. 19A is a block diagram illustrating an example kickslot manager, according to some embodiments. In the illustrated embodiment, kickslot manager 350 implements a software interface and includes register copy engine 1910 and dependency tracking a status circuitry 1920 (e.g., a scoreboard). In the illustrated embodiment, kickslot manager 350 communicates with memory interface 1930, control register interface 1940, and primary control circuitry 210.

In some embodiments, kickslot manager 350 implements multiple "top slots," to which software is able to assign kicks. These top slots are also referred to herein as "tracking slots." Kickslot manager 350 may then handle software-specified dependencies between the kicks, map kicks from tracking slots to logical slots in primary control circuitry 210, track kick execution status, and provide status information to software. In some embodiments, dedicated kickslot manager circuitry may advantageously reduce kick-to-kick transition time relative to software-controlled implementations.

Register copy engine 1910, in some embodiments, is configured to retrieve register data (e.g., for kick configuration registers) from memory via memory interface 1930 and program configuration registers via interface 1940 for a kick. In some embodiments, register copy engine 1910 is configured to pre-fetch configuration register data into an internal buffer (not explicitly shown in FIG. 19A) prior to allocating shader resources for a kick. This may reduce kick-to-kick transition time when initiating a new kick, in various embodiments. Register copy engine 1910 may access control register data via memory interface 1930 and may write control registers via control register interface 1940.

In some embodiments, register copy engine 1910 is configured to prefetch data for kicks in priority order and may not wait for initially-requested register data to be retrieved before requesting additional data (which may absorb memory latency associated with reading the register data). In some embodiments, register copy engine 1910 supports masked broadcast register programming, e.g., based on mGPU masks such that the proper distributed slots are programmed. In some embodiments, using register copy engine 1910 to program control registers may offload work from a primary firmware processor.

In some embodiments, kickslot manager 350 is configured to schedule a kick and send work assignment information to primary control circuitry 210 prior to programming of all configuration registers for a kick. Generally, initial kick scheduling may be pipelined. This may include setup phase register programming, primary control circuitry identifying distributed slots, the register copy engine 1910 programming control registers in parallel with the primary control circuitry queueing work, and the queued work beginning once the final control register has been written. This may allow downstream circuitry to receive and queue work assignments and quickly begin processing once configuration registers are written, further reducing kick-to-kick transition time in some embodiments. In particular, this may save latency associated with multiple control bus traversals relative to waiting to queue work until all control registers are programmed.

Dependency tracking and status circuitry 1920 may store information received from software and provide status information to software via the software interface, as discussed in detail below. In some embodiments, tracking slots are shared by multiple types of primary control circuitry (e.g., compute, pixel, and vertex control circuitry). In other embodiments, certain tracking slots may be reserved for certain types of primary control circuitry.

Figure 19B:
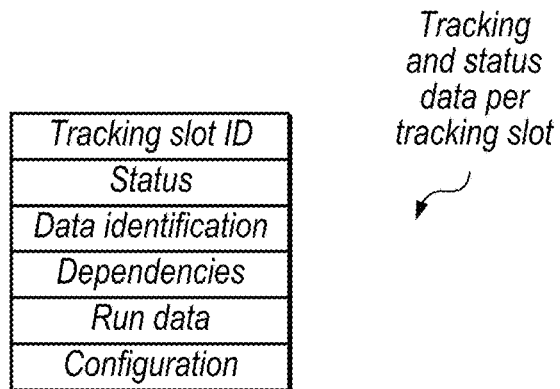

FIG. 19B is a diagram illustrating example tracking and status data per tracking slot, according to some embodiments. In the illustrated embodiment, circuitry 1920 maintains the following information for each tracking slot: identifier, status, data identification, dependencies, run data, and configuration. Each of these example fields is discussed in detail below. In some embodiments, the status and run data fields are read-only by software and the other fields are software configurable.

Each tracking slot may be assigned a unique ID. Thus, the kickslot manager 350 may support a maximum number of tracking slots. In various embodiments, the number of supported tracking slots may be selected such that it is fairly rare that enough small non-dependent kicks can be scheduled in parallel to use all available tracking slots. In some embodiments, the number of supported tracking slots is greater than the number of supported logical slots.

The status field, in some embodiments, indicates the slot's current state and whether the slot is valid. This field may also indicate the logical slot and any distributed slots assigned to the tracking slot, if applicable. In some embodiments, the status field supports the following status values: empty, programming done, register fetch started, waiting for parents, waiting for resources, waiting for distributed slots, running, halt requested, deallocating, de-queued by kickslot manager, de-queued by primary control circuitry, context stored, and complete. In other embodiments, the status field may support other states, a subset of the described states, etc. Example states are discussed in detail below with reference to the state machine of FIG. 21.

The data identification field, in some embodiments, indicates the location of control register data for the kick. This may be specified as an initial register address and a number of configuration registers, for example. It may also include a register context identifier. In some embodiments, the data identification field also indicates other resources used by the kick, such as samplers or memory apertures. Some of these resources may be hard resources, such that the kick cannot proceed until they are available, while other resources may be soft resources and a kick may proceed without them or with only a portion of requested resources, in certain situations. As one example, memory apertures may be considered soft resources and kicks may be allowed to proceed even if their soft resources are not available (potentially with a notification sent to the requesting software).

The dependency field, in some embodiments, indicates any dependencies for the slot on kicks in other slots. As one example, circuitry 1920 may implement an N×N matrix (where N is the number of tracking slots) where each slot includes an entry for each other slot that indicates whether the slot depends on the other slot. Entries may be cleared as kicks from other slots complete. In other embodiments, dependencies may be encoded using other techniques. Kickslot manager 350 may assign tracking slots to logical slots according to the indicated dependencies (e.g., by waiting to assign a kick to a logical slot until all tracking slots on which it depends have completed). Moving dependency tracking from software/firmware control to dedicated hardware may allow for more efficient use of logical slots and may reduce kick-to-kick transitions.

The run data field, in some embodiments, provides information regarding the run status of kicks. For example, this field may provide timestamps for assignment of a kick to a logical slot, when a kick begins running on distributed slots, and when a kick is finished. Various other performance or debug information may be indicated as well. In some embodiments, various tracking slot information is retained for slots with the retain field set and their mapped hardware resources are also not released (potentially allowing access to status registers at the logical slot level, distributed slot level, or both).

The configuration field, in some embodiments, indicates the type of primary control circuitry controlling the slot (e.g., compute, pixel, or vertex), the priority of the slot, a retain slots indication, a force end of kick interrupt indication, or any combination thereof. This configuration field may be programmable by software to indicating configuration of the slot and provide certain software override information, for example. An end of kernel interrupt may be set globally or may be set to trigger per kick (or to trigger after a threshold number of kicks). This may advantageously reduce firmware time spent handling interrupts (by omitting interrupts in certain situations) while still retaining interrupt functionality when needed.

In various embodiments, the disclosed tracking circuitry may allow software to handle a number of kicks in parallel (e.g., with the ability to start, stop, query, and modify execution of these kicks).

FIG. 20 is a diagram illustrating example register prefetch buffer organization, according to some embodiments. In the illustrated embodiment, registers are organized by type (e.g., with all the setup registers at the beginning of the buffer and the execution registers at the end of the buffer, in this example). Generally speaking, setup registers are used for configuring a kick before it starts and execution registers are used for distributed execution of a kick. In the illustrated embodiment, the buffer indicates the offset within the configuration register space at which a register is located and its payload.

This organization of prefetched register data may advantageously allow overwrites of prior registers, e.g., for kick-to-kick buffer re-use while still allowing saving new registers at the beginning or end of a block of registers of a given type. In various embodiments, registers of two or more different types may be grouped together by type to facilitate such techniques. In some embodiments, the register prefetch buffer is an SRAM. In other embodiments, the register prefetch buffer is a cache and may evict entries when additional space is needed (e.g., according to a least-recently-used algorithm or another appropriate eviction algorithm).

FIG. 21 is a state machine diagram illustrating example kickslot manager states, according to some embodiments. From empty state 2110, control circuitry is configured to make a slot valid to allocate the slot for a kick. When the data for the slot has been programmed (e.g., the dependencies and configuration discussed above with reference to FIG. 19B), the state transitions to "programming done" state 2112. After the register copy engine 1910 has accepted a fetch request, the state transitions to register fetch started 2114 (note that this is a prefetch, prior to allocating resources to the tracking slot, in the illustrated embodiment). After the register copy engine 1910 has indicated that a fetch is complete, the state transitions to "wait for parents" state 2116. Once all dependencies are satisfied for the tracking slot the state transitions to "wait for resources" state 2118.

As shown, if a halt is requested in any of states 2110-2118, the state transitions to "de-queued from KSM" 2126. Once the slot is reset, the state transitions back to empty state 2110. Note that state 2116 may require substantially less deallocation operations than other halt states discussed in detail below, e.g., because resources have not yet been allocated to the slot.

Once resources are allocated, the state transitions to "wait for dSlot state" 2120 and the KSM waits for a control response at 2124 (e.g., from primary control circuitry). Once dSlot(s) are allocated, the state transitions to running state 2122. If a halt is requested in these states (shown at 2128), the KSM waits for a control response at 2130. If the kick is done after a halt request or from running state 2122, the slot is deallocated at 2132 and the kick is complete at 2138.

If a halt is requested in states 2120 or 2122 and the control response 2130 indicates that a logical slot is stored, the state transitions to deallocating state 2134 and waits for context to be stored at 2140 before resetting the slot. If the control response at 2130 indicates a de-queue, the state transitions to deallocating 2136 and then "de-queued from primary control circuitry" 2142 before resetting the slot (this may be a more graceful de-queue that does not require a context store of the logical slot, relative to states 2134 and 2140). Speaking generally, disclosed techniques may advantageously allow primary control circuitry to pause scheduling of work at multiple levels and allow firmware to interact with hardware in a safe manner.

Once the slot is reset from states 2138, 2140, or 2142, the kickslot manager determines whether the retain field is set and transitions back to empty state 2110 if not. If the retain field is set, KSM waits for any assigned logical slots to be deallocated at 2148 (e.g., based on software control). Speaking generally, tracking slots may be automatically recycled unless they are explicitly retained.

As discussed above, dependency tracking and status circuitry 1920 may provide current state for each slot to software.

In some embodiments, kickslot manager 350 is scalable across multiple GPU sizes, e.g., by allowing variation in the number of tracking slot supported. Disclosed dynamical hierarchical scheduling of tracking slots (by firmware or software) then logical slots (by primary control circuitry) then distributed slots may advantageously provide efficient distribution with scheduling intelligence distributed across the hierarchical levels.

In some embodiments, kickslot manager 350 is configured to perform one or more power control operations based on tracking slots. For example, control circuitry may reduce the power state of one or more circuits (e.g., by clock gating, power gating, etc.). In some embodiments with a large number of tracking slots, control circuitry may reduce the power state of other circuitry even when that other circuitry has work queued in a tracking slot. For example, control circuitry may reduce the power state of the pixel data master even when it has a kick in a tracking slot.

In some embodiments, the first action for a scheduled tracking slot is an increase in the power state of any associated circuitry, if it is in a lower power state than desired. For example, control circuitry may start pixel kicks by writing a power-on register for the pixel data master. Speaking generally, the device may power gate various types of logic (e.g., caches, filtering logic, ray tracing circuitry, etc.) and power those logic blocks on when a tracking slot will use that logic. In some embodiments, kickslot manager 350 maintains one or more flags for each tracking slot that that indicate whether the kick assigned to the tracking slot uses one or more types of circuitry. Kickslot manager 350 may cause those types of circuitry to meet a required power state in response to scheduling of those tracking slots.

Example Methods

Figure 22:
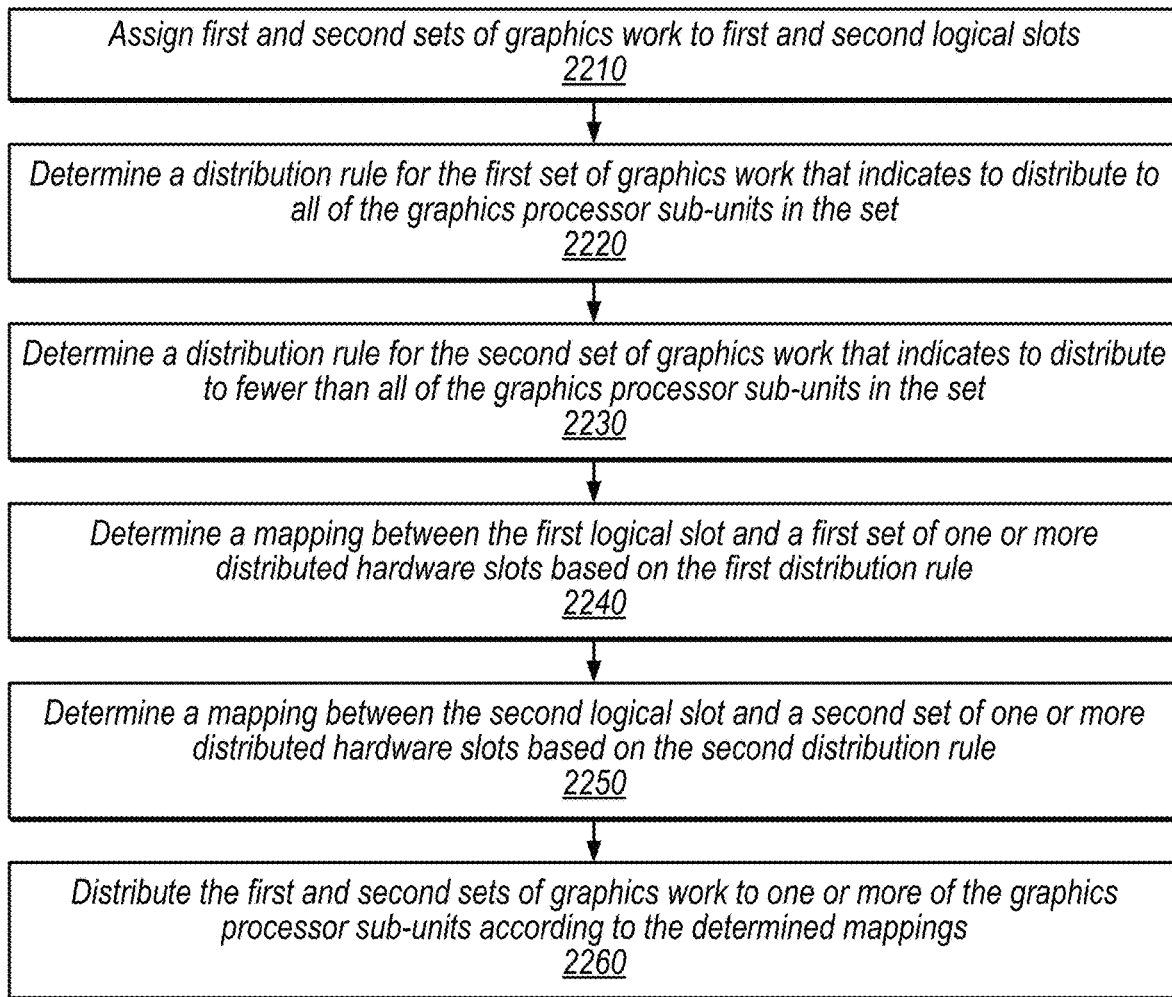
FIGS. 22-25 are flow diagrams illustrating example methods, according to some embodiments.

FIG. 22 is a flow diagram illustrating an example method for distributing graphics work using logical slots, according to some embodiments. The method shown in FIG. 22 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 2210, in the illustrated embodiment, control circuitry assigns first and second sets of graphics work to first and second logical slots. In some embodiments, circuitry implements a plurality of logical slots and a set of graphics processor sub-units each implement multiple distributed hardware slots. In some embodiments, the graphics processor sub-units are organized into multiple groups of multiple sub-units, where sub-units in the same group share a cache. In some embodiments, the sub-units of a given group are implemented on the same physical die. In some embodiments, the sub-units include respective fragment generator circuitry, shader core circuitry, memory system circuitry that includes a data cache and a memory management unit, geometry processing circuitry, and distributed workload distribution circuitry. In some embodiments, distributed hardware slots include respective: configuration registers, batch queue circuitry, and batch iteration circuitry. In various embodiments, shader circuitry in a sub-unit is configured to receive and perform work from its plurality of distributed hardware slots.

Reciting that "a set of graphics processor sub-units each implement multiple distributed hardware slots" means that the set of graphics processor sub-units includes at least two sub-units, each of which implements multiple distributed hardware slots. In some embodiments, a device may have additional graphics processor sub-units (that are not in the set) which do not necessarily implement multiple distributed hardware slots. The phrase "a set of graphics processor sub-units each implement multiple distributed hardware slots" is thus not to be interpreted to mean that in all cases, all sub-units in the device implement multiple distributed hardware slots—it simply provides for the possibility that this might be the case in some instances, and not in others. Similar interpretation is intended for other recitations herein that use the term "each."

At 2220, in the illustrated embodiment, control circuitry determines a distribution rule for the first set of graphics work that indicates to distribute to all of the graphics processor sub-units in the set.

At 2230, in the illustrated embodiment, control circuitry determines a distribution rule for the second set of graphics work that indicates to distribute to fewer than all of the graphics processor sub-units in the set. In some embodiments, the determined distribution rule for the second set of graphics work indicates to distribute the first set of graphics work to a single group of sub-units. Alternatively, the determined distribution rule for the second set of graphics work may indicate to distribute the second set of graphics work to a single sub-unit.

The control circuitry may select the first and second distribution rules based on amounts of work in the first and second sets of graphics work. The control circuitry may determine the first distribution rule based on one or more software overrides signaled by a graphics program being executed. These may include any appropriate combination of the following types of example software overrides: mask information that indicates which sub-units are available to the first set of work, a specified distribution rule, group information that indicates a group of sub-units on which the first set of work should be deployed, and policy information that indicates a scheduling policy. In some embodiments, the control circuitry determines respective hold values for slots of the plurality of logical slots, where the hold values indicate status of kernels for a logical slot. The control circuitry may allow a logical slot with a first priority level to reclaim a hardware slot that is assigned to a logical slot with a second, lower priority level, based on one or more of the respective hold values.

The first and second sets of graphics work may be kicks. The first and second sets of graphics work may be compute kernels in the same kick or in different kicks. Thus, in some embodiments, the first set of graphics work is a first kernel of a compute kick assigned to the first logical slot, where the compute kick includes at least one other kernel and where the apparatus is configured to select a different distribution rule for the at least one other kernel than for the first kernel.

At 2240, in the illustrated embodiment, control circuitry determines a mapping between the first logical slot and a first set of one or more distributed hardware slots based on the first distribution rule.

At 2250, in the illustrated embodiment, control circuitry determines a mapping between the second logical slot and a second set of one or more distributed hardware slots based on the second distribution rule At 2260, in the illustrated embodiment, control circuitry distributes the first and second sets of graphics work to one or more of the graphics processor sub-units according to the determined mappings.

In some embodiments, control circuitry for a logical slot includes: a control stream processor (e.g., a CSP 630) configured to determine the first and second distribution rules, a kernel processor (e.g., circuitry 640) configured to generate batches of compute workgroups, sub-unit assignment circuitry (e.g., circuitry 650) configured to assign batches of compute workgroups to sub-units. In some embodiments, the control circuitry includes hardware slot resource allocator circuitry (e.g., circuitry 620) configured to allocate hardware slots to control stream processors based on an indicated distribution rule and logical slot arbiter circuitry (e.g., circuitry 660) configured to arbitrate among batches from different logical slots for distribution to assigned sub-units. In some embodiments, the hardware slot resource allocator circuitry is configured to allocate hardware slot based on states of hardware slots. The states for different hardware slots may include at least: invalid, running, emptied, and flushing, for example.

In some embodiments, the device is configured to execute multiple types of cache flush invalidate operations, which may include a first type of cache flush invalidate operation that flushes and invalidates caches only for one or more sub-units to which a kernel was assigned and an unconditional type of cache flush invalidation operation that flushes and invalidates all caches for the set of graphics processor sub-units at one or more cache levels.

Figure 23:
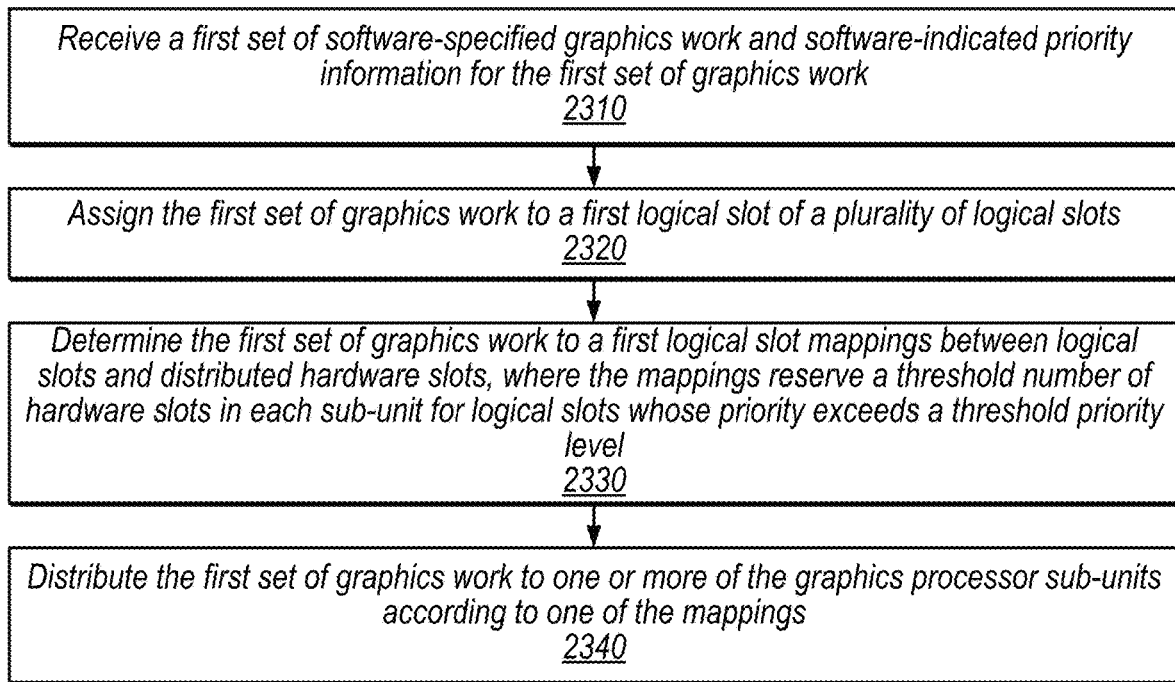

FIG. 23 is a flow diagram illustrating an example method for prioritizing logical slots, according to some embodiments. The method shown in FIG. 23 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 2310, in the illustrated embodiment, control circuitry receives a first set of software-specified graphics work and software-indicated priority information for the first set of graphics work.

At 2320, in the illustrated embodiment, control circuitry assigns the first set of graphics work to a first logical slot of a plurality of logical slots implemented by the device.

At 2330, in the illustrated embodiment, control circuitry determines mappings between logical slots and distributed hardware slots implemented by graphics sub-units of the device, where the mappings reserve a threshold number of hardware slots in each sub-unit for logical slots whose priority exceeds a threshold priority level. In some embodiments, a first subset of logical slots are high priority slots and the remaining logical slots are low priority slots. In these embodiments, the control circuitry may assign the first set of graphics work to the first logical slot based on the software-indicated priority information. In other embodiments, priority may be encoded and tracked using various other techniques.

At 2340, in the illustrated embodiment, control circuitry distributes the first set of graphics work to one or more of the graphics processor sub-units according to one of the mappings.

In some embodiments, control circuitry (e.g., distributed slot resource allocator circuitry) is configured to perform a reclaim procedure that allows a logical slot with a first software-indicated priority level to reclaim a hardware slot that was assigned to a logical slot with a second, lower priority level.

In some embodiments, based on software input for the first set of graphics work (e.g., a retain slots command), the control circuitry is configured to maintain the mapping of distributed hardware slots for the first logical slot after completion of processing for the first set of graphics work. In some embodiments, the control circuitry assigns e mapped distributed hardware slots for the first set of graphics work to another logical slot only after software input that indicates to release the mapped distributed slots.

In some embodiments, the control circuitry provides status information to software for the first set of graphics work. The control circuitry may support various status states, including without limitation: waiting on dependencies, waiting for configuration data for the first set of graphics work, waiting for assignment distributed slots, waiting for hardware resources, empty, programming complete, waiting for a logical slot, deallocating, and context stored. The status information may identify the first logical slot, identify assigned distributed hardware slots, or indicate timestamp information associated with execution of the first set of graphics work, for example.

The control circuitry may support various software control or override functionality in addition to or in place of priority information, including without limitation: a specified distribution rule that indicates whether to distribute to only a portion of the graphics processor sub-units in the set or to distribute to all of the graphics processor sub-units in the set, group information that indicates a group of sub-units on which the first set of graphics work should be deployed, mask information that indicates which sub-units are available to the first set of graphics work, and policy information that indicates a scheduling policy.

In some embodiments, the device includes control stream processor circuitry configured to determine distribution rules for the mappings and distributed slot resource allocator circuitry configured to determine the mappings based on: software input, determined distribution rules from the control stream processor circuitry, distributed slot state information.

Figure 24:

FIG. 24 is a flow diagram illustrating an example method for affinity-based scheduling, according to some embodiments. The method shown in FIG. 24 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 2410, in the illustrated embodiment, control circuitry (e.g., kernel walker circuitry) receives a software-specified set of graphics work (e.g., a compute kernel) and a software-indicated mapping of portions of the set of graphics work to groups of graphics processor sub-units. The first group of sub-units may share a first cache and the second group of sub-units may share a second cache. Note that the mapping may or may not identify specific groups of graphics sub-units. Rather, the mapping may specify that multiple portions of the compute kernel should be assigned to the same group of graphics processor sub-units but may allow hardware to determine which group of graphics processor sub-units to actually assign.

At 2420, in the illustrated embodiment, control circuitry assigns, based on the mapping, a first subset of the set of graphics work to the first group of graphics sub-units and a second subset of the set of graphics work to the second group of graphics sub-units.

The control circuitry may be configured to store, in configuration registers, multiple mappings of portions of sets of graphics work to groups of graphics processor sub-units.

The kernel walker circuitry may include: primary kernel walker circuitry (e.g., element 1610 of FIG. 16) configured to determine the portions of the compute kernel, first group walker circuitry (e.g., an element 1620 of FIG. 16) configured to iterate portions of the compute kernel assigned to the first group of graphics sub-units to determine batches of workgroups, and second group walker circuitry configured to iterate portions of the compute kernel assigned to the second group of graphics sub-units to determine batches of workgroups. The kernel walker circuitry may further include: group walker arbitration circuitry (e.g., element 1630 of FIG. 16) configured to select from among batches of workgroups determined by the first and second group walker circuitry and sub-unit assign circuitry (e.g., mGPU assign circuitry 650) configured to assign batches selected by the group walker arbitration circuitry to one or more graphics sub-units in the group of sub-units corresponding to the selected group walker circuitry.

In some embodiments, the device includes work sharing control circuitry configured to: determine a set of one or more other groups of sub-units that have dispatched all of their assigned portions for the compute kernel and assign at least a first portion of the compute kernel, that was indicated by the mapping as targeting the first group of sub-units, to a group of the one or more other groups of sub-units.

In some embodiments, the control circuitry disables affinity-based work distribution in one or more modes of operation. The control circuitry may support mappings of portions of compute kernels to groups of graphics processor sub-units affinity maps for multiple dimensionalities of compute kernels including single-dimension kernels, two-dimensional kernels, and three-dimensional kernels.

In some embodiments, a non-transitory computer-readable medium having instructions stored thereon that are executable by a computing device to perform operations comprising: receiving a compute kernel and a corresponding mapping of portions of the compute kernel to groups of graphics processor sub-units, where the compute kernel and mapping are specified by the instructions and the mapping indicates cache affinity for a set of portions of the compute kernel mapped to a given group of graphics processor sub-units; and assigning, based on the mapping, a first subset of the compute kernel to a first group of graphics sub-units and a second subset of the compute kernel to a second group of graphics sub-units.

Figure 25:
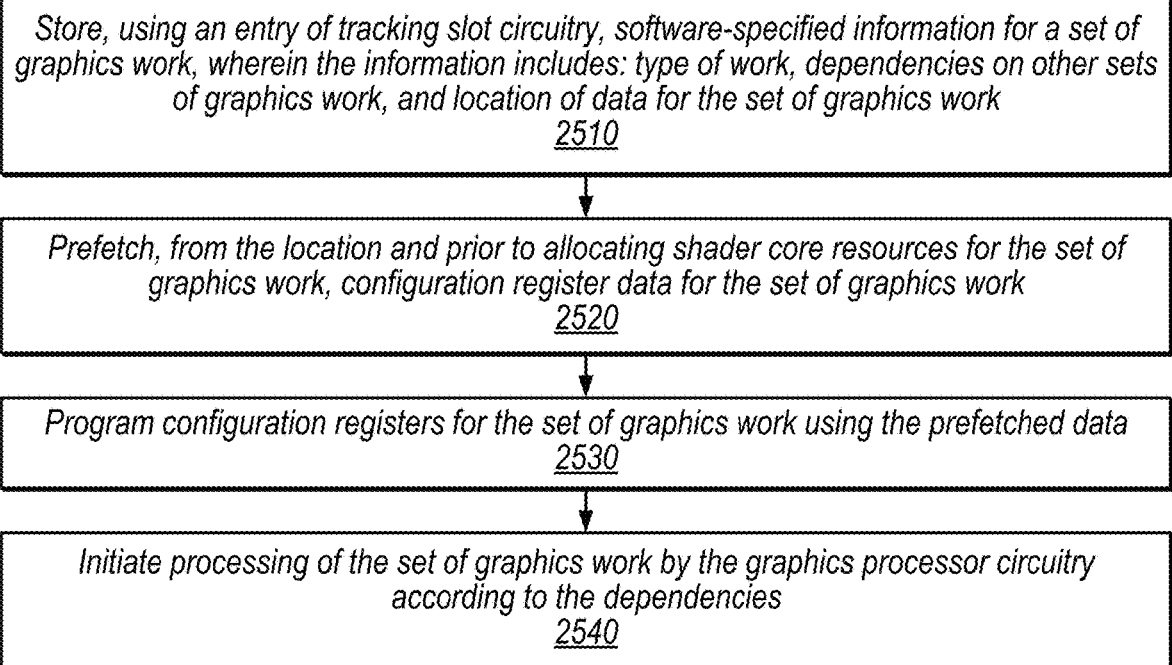

FIG. 25 is a flow diagram illustrating an example method for kickslot manager operation, according to some embodiments. The method shown in FIG. 25 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 2510, in the illustrated embodiment, control circuitry (e.g., slot manager circuitry) stores, using an entry of tracking slot circuitry, software-specified information for a set of graphics work, wherein the information includes: type of work, dependencies on other sets of graphics work, and location of data for the set of graphics work In some embodiments, the tracking slot circuitry is software-accessible to query various information associated with the set of graphics work. This may include, for example, status for the set of graphics work, timestamp information associated with execution of the set of graphics work, information indicating the logical primary slot, and information indicating the one or more distributed hardware slots. In some embodiments, the tracking slot circuitry supports status values that indicate at least the following status states for the set of graphics work: empty, register fetch initiated, waiting for one or more other sets of graphics work, waiting for logical slot resources, waiting for distributed hardware slot resources, and running.

At 2520, in the illustrated embodiment control circuitry prefetches, from the location and prior to allocating shader core resources for the set of graphics work, configuration register data for the set of graphics work. Note that the prefetches may occur after configuration of a tracking slot for the set of graphics work, but before the control circuitry determines to start the set of graphics work (e.g., before all its dependencies have been satisfied). The control circuitry may utilize various criteria for determining when to begin prefetching. The prefetch may be performed from a shared memory (which may be shared among multiple instances of control circuitry, shared with non-GPU processors, or both) into an SRAM memory element of slot manager circuitry.

In some embodiments, the control circuitry sends, prior to completion of programming the configuration registers, portions of the set of graphics work to hardware slots assigned to the set of graphics work. The hardware slots may hardware slots include queue circuitry for received portions of the set of graphics work.

At 2530, in the illustrated embodiment control circuitry programs configuration registers for the set of graphics work using the prefetched data. The configuration register may specify properties of the set of graphics work, location of data for the set of graphics work, parameters for processing the set of graphics work, etc. The configuration register may be distinct from data registers that store data to be processed by the set of graphics work.

At 2540, in the illustrated embodiment control circuitry initiates processing of the set of graphics work by the graphics processor circuitry according to the dependencies. The control circuitry may assign set of graphics work to a logical primary slot (and at least a portion of the configuration register data may be for configuration registers of the logical primary slot) and assign the logical slot to one or more distributed hardware slots (and at least a portion of the configuration register data may be for configuration registers of the one or more distributed hardware slots).

In some embodiments, control circuitry is configured, in conjunction with initiating a set of graphics work from an entry of the tracking slot circuitry and based on information about the set of graphics work, to initiate an increase from a lower power mode to a higher power mode for one or more circuits associated with the set of graphics work.

In some embodiments, graphics instructions specify to store the information for the set of graphics work (e.g., indicating the type of work, dependencies on other sets of graphics work, and location of data for the set of graphics work) and queries the tracking slot circuitry to determine status information for the set of graphics work (e.g., a status from among: empty, register fetch initiated, waiting for one or more other sets of graphics work, waiting for logical slot resources, waiting for distributed hardware slot resources, and running, timestamp information associated with execution of the set of graphics work, information indicating an assigned logical primary slot, and information indicating assigned distributed hardware slots.

In some embodiments, in response to a halt command for the set of graphics work, control circuitry is configured to perform different operations depending on current status of the tracking slot. For example, control circuitry may, in response to determining that a logical primary slot has not been assigned, reset the entry of the tracking slot circuitry. As another example, control circuitry may, in response to determining that a logical primary slot has been assigned, de-allocate the logical primary slot and reset the entry of the tracking slot circuitry. As yet another example, control circuitry may, in response to determining that one or more distributed hardware slots have been assigned, perform one or more context switch operations, deallocate the one or more distributed hardware slots, de-allocate the logical primary slot, and reset the entry of the tracking slot circuitry.

Example Device

Figure 26:
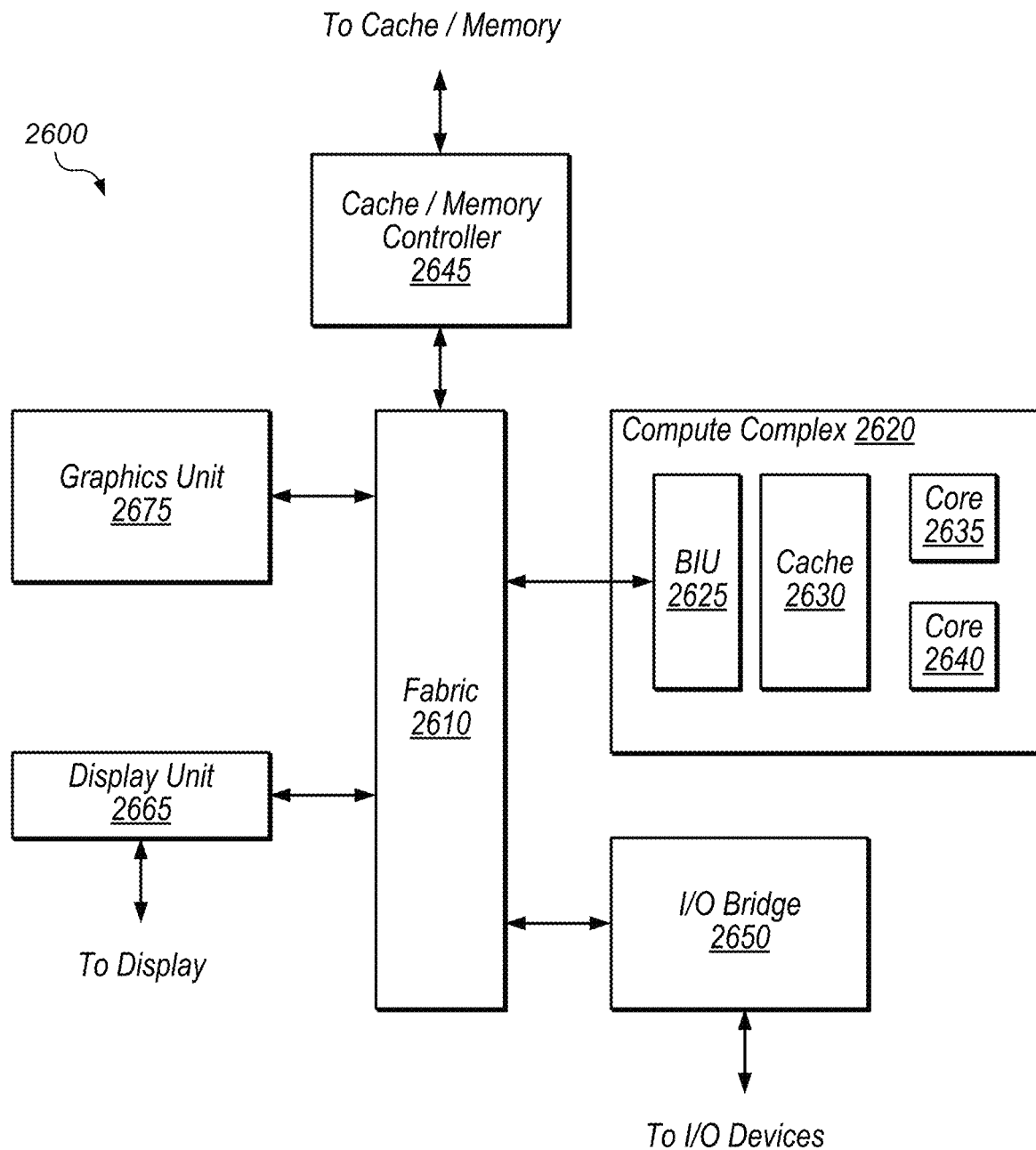
FIG. 26 is a block diagram illustrating an example computing device, according to some embodiments.

Referring now to FIG. 26, a block diagram illustrating an example embodiment of a device 2600 is shown. In some embodiments, elements of device 2600 may be included within a system on a chip. In some embodiments, device 2600 may be included in a mobile device, which may be battery-powered. Therefore, power consumption by device 2600 may be an important design consideration. In the illustrated embodiment, device 2600 includes fabric 2610, compute complex 2620 input/output (I/O) bridge 2650, cache/memory controller 2645, graphics unit 2675, and display unit 2665. In some embodiments, device 2600 may include other components (not shown) in addition to or in place of the illustrated components, such as video processor encoders and decoders, image processing or recognition elements, computer vision elements, etc.

Fabric 2610 may include various interconnects, buses, MUX's, controllers, etc., and may be configured to facilitate communication between various elements of device 2600. In some embodiments, portions of fabric 2610 may be configured to implement various different communication protocols. In other embodiments, fabric 2610 may implement a single communication protocol and elements coupled to fabric 2610 may convert from the single communication protocol to other communication protocols internally.

In the illustrated embodiment, compute complex 2620 includes bus interface unit (BIU) 2625, cache 2630, and cores 2635 and 2640. In various embodiments, compute complex 2620 may include various numbers of processors, processor cores and caches. For example, compute complex 2620 may include 1, 2, or 4 processor cores, or any other suitable number. In one embodiment, cache 2630 is a set associative L2 cache. In some embodiments, cores 2635 and 2640 may include internal instruction and data caches. In some embodiments, a coherency unit (not shown) in fabric 2610, cache 2630, or elsewhere in device 2600 may be configured to maintain coherency between various caches of device 2600. BIU 2625 may be configured to manage communication between compute complex 2620 and other elements of device 2600. Processor cores such as cores 2635 and 2640 may be configured to execute instructions of a particular instruction set architecture (ISA) which may include operating system instructions and user application instructions.

Cache/memory controller 2645 may be configured to manage transfer of data between fabric 2610 and one or more caches and memories. For example, cache/memory controller 2645 may be coupled to an L3 cache, which may in turn be coupled to a system memory. In other embodiments, cache/memory controller 2645 may be directly coupled to a memory. In some embodiments, cache/memory controller 2645 may include one or more internal caches.

As used herein, the term "coupled to" may indicate one or more connections between elements, and a coupling may include intervening elements. For example, in FIG. 26, graphics unit 2675 may be described as "coupled to" a memory through fabric 2610 and cache/memory controller 2645. In contrast, in the illustrated embodiment of FIG. 26, graphics unit 2675 is "directly coupled" to fabric 2610 because there are no intervening elements.

Graphics unit 2675 may include one or more processors, e.g., one or more graphics processing units (GPU's). Graphics unit 2675 may receive graphics-oriented instructions, such as OPENGL®, Metal, or DIRECT3D® instructions, for example. Graphics unit 2675 may execute specialized GPU instructions or perform other operations based on the received graphics-oriented instructions. Graphics unit 2675 may generally be configured to process large blocks of data in parallel and may build images in a frame buffer for output to a display, which may be included in the device or may be a separate device. Graphics unit 2675 may include transform, lighting, triangle, and rendering engines in one or more graphics processing pipelines. Graphics unit 2675 may output pixel information for display images. Graphics unit 2675, in various embodiments, may include programmable shader circuitry which may include highly parallel execution cores configured to execute graphics programs, which may include pixel tasks, vertex tasks, and compute tasks (which may or may not be graphics-related).

In some embodiments, graphics unit 2675 includes various disclosed circuitry that implements tracking slots, logical slots, distributed hardware slots, etc.

Display unit 2665 may be configured to read data from a frame buffer and provide a stream of pixel values for display. Display unit 2665 may be configured as a display pipeline in some embodiments. Additionally, display unit 2665 may be configured to blend multiple frames to produce an output frame. Further, display unit 2665 may include one or more interfaces (e.g., MIPI® or embedded display port (eDP)) for coupling to a user display (e.g., a touchscreen or an external display).

I/O bridge 2650 may include various elements configured to implement: universal serial bus (USB) communications, security, audio, and low-power always-on functionality, for example. I/O bridge 2650 may also include interfaces such as pulse-width modulation (PWM), general-purpose input/output (GPIO), serial peripheral interface (SPI), and inter-integrated circuit (I2C), for example. Various types of peripherals and devices may be coupled to device 2600 via I/O bridge 2650.

In some embodiments, device 2600 includes network interface circuitry (not explicitly shown), which may be connected to fabric 2610 or I/O bridge 2650. The network interface circuitry may be configured to communicate via various networks, which may be wired, wireless, or both. For example, the network interface circuitry may be configured to communicate via a wired local area network, a wireless local area network (e.g., via WiFi), or a wide area network (e.g., the Internet or a virtual private network). In some embodiments, the network interface circuitry is configured to communicate via one or more cellular networks that use one or more radio access technologies. In some embodiments, the network interface circuitry is configured to communicate using device-to-device communications (e.g., Bluetooth or WiFi Direct), etc. In various embodiments, the network interface circuitry may provide device 2600 with connectivity to various types of other devices and networks.

Example Applications

Figure 27:
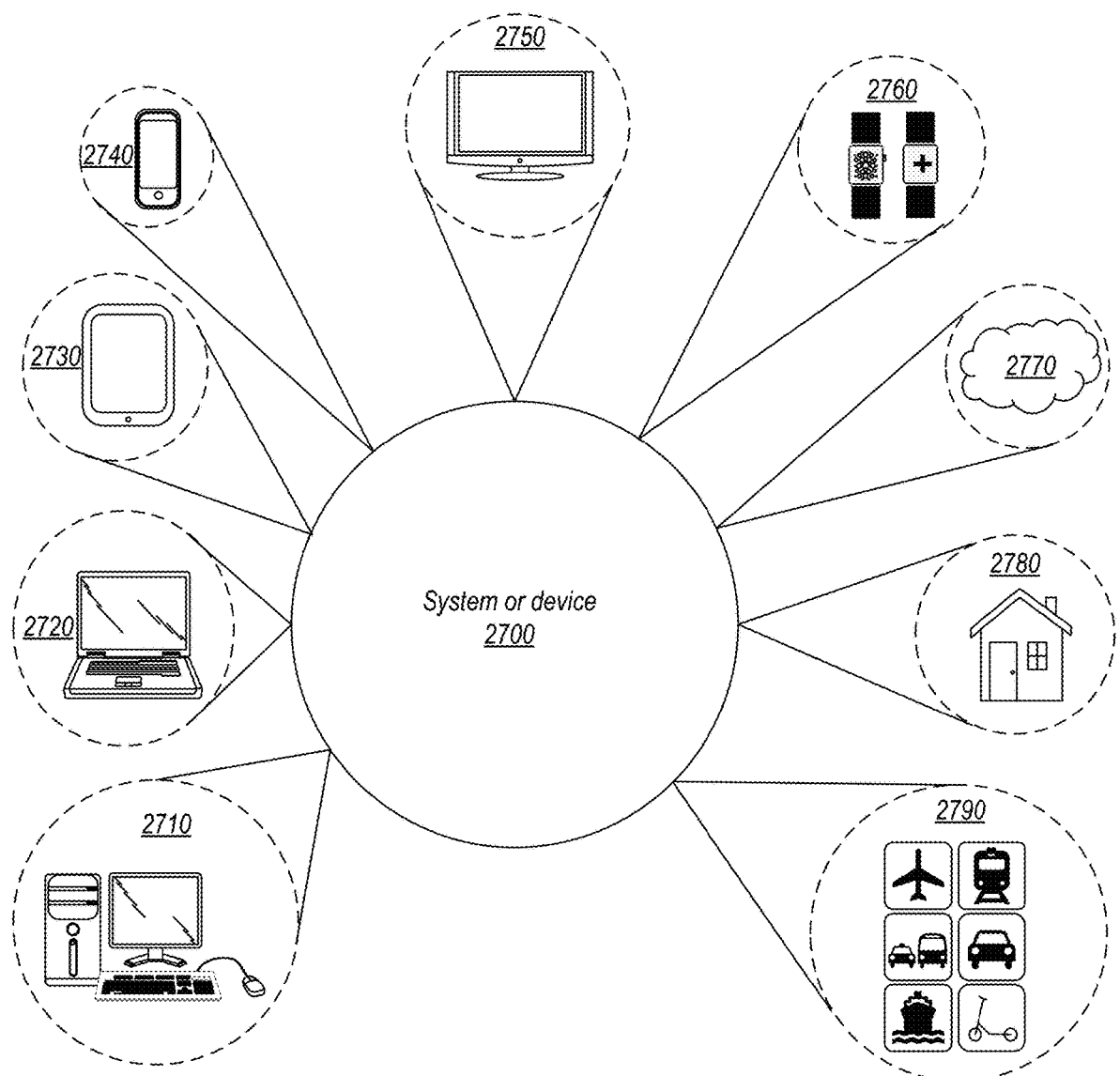
FIG. 27 is a diagram illustrating example applications of disclosed systems and devices, according to some embodiments.

Turning now to FIG. 27, various types of systems that may include any of the circuits, devices, or system discussed above. System or device 2700, which may incorporate or otherwise utilize one or more of the techniques described herein, may be utilized in a wide range of areas. For example, system or device 2700 may be utilized as part of the hardware of systems such as a desktop computer 2710, laptop computer 2720, tablet computer 2730, cellular or mobile phone 2740, or television 2750 (or set-top box coupled to a television).

Similarly, disclosed elements may be utilized in a wearable device 2760, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 2700 may also be used in various other contexts. For example, system or device 2700 may be utilized in the context of a server computer system, such as a dedicated server or on shared hardware that implements a cloud-based service 2770. Still further, system or device 2700 may be implemented in a wide range of specialized everyday devices, including devices 2780 commonly found in the home such as refrigerators, thermostats, security cameras, etc. The interconnection of such devices is often referred to as the "Internet of Things" (IoT). Elements may also be implemented in various modes of transportation. For example, system or device 2700 could be employed in the control systems, guidance systems, entertainment systems, etc. of various types of vehicles 2790.

The applications illustrated in FIG. 27 are merely exemplary and are not intended to limit the potential future applications of disclosed systems or devices. Other example applications include, without limitation: portable gaming devices, music players, data storage devices, unmanned aerial vehicles, etc.

Example Computer-Readable Medium

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that is recognized by a fabrication system configured to produce hardware (e.g., an integrated circuit) that includes the disclosed circuitry. Claims to such a storage medium are intended to cover, for example, an entity that produces a circuit design, but does not itself fabricate the design.

Figure 28:
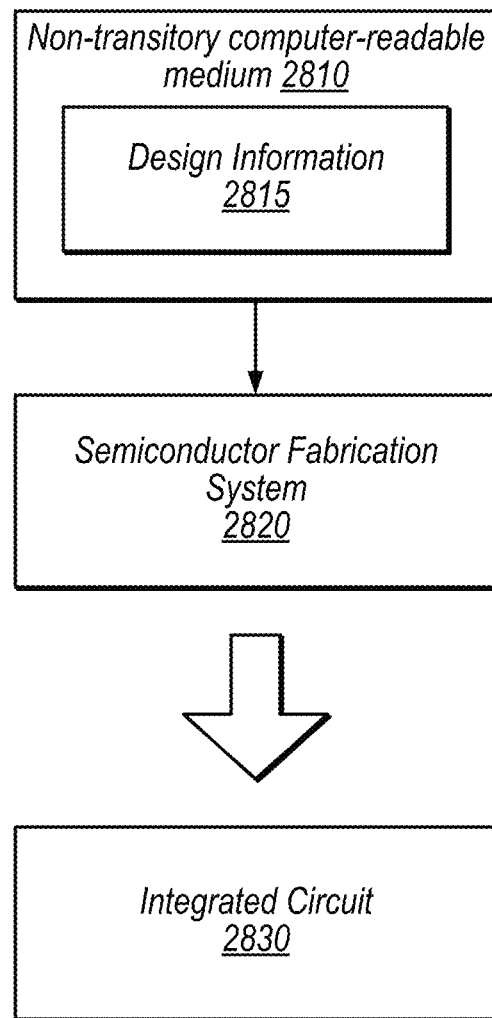
FIG. 28 is a block diagram illustrating an example computer-readable medium that stores circuit design information, according to some embodiments.

FIG. 28 is a block diagram illustrating an example non-transitory computer-readable storage medium that stores circuit design information, according to some embodiments. In the illustrated embodiment semiconductor fabrication system 2820 is configured to process the design information 2815 stored on non-transitory computer-readable medium 2810 and fabricate integrated circuit 2830 based on the design information 2815.

Non-transitory computer-readable storage medium 2810, may comprise any of various appropriate types of memory devices or storage devices. Non-transitory computer-readable storage medium 2810 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 2810 may include other types of non-transitory memory as well or combinations thereof. Non-transitory computer-readable storage medium 2810 may include two or more memory mediums which may reside in different locations, e.g., in different computer systems that are connected over a network.

Design information 2815 may be specified using any of various appropriate computer languages, including hardware description languages such as, without limitation: VHDL, Verilog, SystemC, SystemVerilog, RHDL, M, MyHDL, etc. Design information 2815 may be usable by semiconductor fabrication system 2820 to fabricate at least a portion of integrated circuit 2830. The format of design information 2815 may be recognized by at least one semiconductor fabrication system 2820. In some embodiments, design information 2815 may also include one or more cell libraries which specify the synthesis, layout, or both of integrated circuit 2830. In some embodiments, the design information is specified in whole or in part in the form of a netlist that specifies cell library elements and their connectivity. Design information 2815, taken alone, may or may not include sufficient information for fabrication of a corresponding integrated circuit. For example, design information 2815 may specify the circuit elements to be fabricated but not their physical layout. In this case, design information 2815 may need to be combined with layout information to actually fabricate the specified circuitry.

Integrated circuit 2830 may, in various embodiments, include one or more custom macrocells, such as memories, analog or mixed-signal circuits, and the like. In such cases, design information 2815 may include information related to included macrocells. Such information may include, without limitation, schematics capture database, mask design data, behavioral models, and device or transistor level netlists. As used herein, mask design data may be formatted according to graphic data system (GDSII), or any other suitable format.

Semiconductor fabrication system 2820 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 2820 may also be configured to perform various testing of fabricated circuits for correct operation.

In various embodiments, integrated circuit 2830 is configured to operate according to a circuit design specified by design information 2815, which may include performing any of the functionality described herein. For example, integrated circuit 2830 may include any of various elements shown in FIGS. 1B, 2-3, 6, 14B, 16, 18, 19A, and 26. Further, integrated circuit 2830 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a. memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can. as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:
1. An apparatus, comprising:
a graphics processor, comprising:
cache circuitry configured to cache data from a system memory;
circuitry that implements a plurality of logical slots;
a set of graphics processor sub-units that each implement multiple distributed hardware slots, wherein:

a given distributed hardware slot includes work queue circuitry configured to store graphics work and configuration registers corresponding to the stored graphics work; and a given graphics processor sub-unit includes shader circuitry configured to execute instructions specified by stored graphics work in the given graphics processor sub-unit's multiple distributed hardware slots, such that assignment of graphics work to a given distributed hardware slot of the multiple distributed hardware slots of the given graphics processor sub-unit assigns execution of the assigned graphics work to the given graphics processor sub-unit's shader circuitry; and control circuitry configured to:
receive a first set of graphics work that is software-specified and software-indicated priority information for the first set of graphics work;
assign the first set of graphics work to a first logical slot;
determine a set of reserved distributed hardware slots that are reserved for logical slots whose assigned graphics work has a priority level that meets a threshold priority level;
determine mappings between the plurality of logical slots and distributed hardware slots of the multiple distributed hardware slots of one or more graphics processor sub-units of the set of graphics processor sub-units, wherein the mappings are determined according to the determined set of reserved distributed hardware slots such that logical slots whose assigned graphics work has a priority level that do not meet the threshold priority level are mapped only to non-reserved distributed hardware slots;
distribute the first set of graphics work, assigned to the first logical slot, to a first set of one or more target distributed hardware slots of one or more graphics processor sub-units of the set of graphics processor sub-units according to one of the mappings; and
execute the first set of graphics work from the first set of one or more target hardware slots using the shader circuitry of one or more graphics processor sub-units of the set of graphics processor sub-units that implement the first set of one or more target hardware slots.

2. The apparatus of claim 1, wherein, based on software input for the first set of graphics work, the control circuitry is configured to:
maintain mapping of the first set of one or more target distributed hardware slots for the first logical slot after completion of the execution of the first set of graphics work; and
assign the mapped first set of one or more target distributed hardware slots for the first set of graphics work to another logical slot only after software input that indicates to release the mapped first set of one or more target distributed hardware slots.

3. The apparatus of claim 1, wherein:
the given distributed hardware slot further includes:
iteration circuitry configured to iterate through the stored graphics work of the given distributed hardware slot;
the given graphics processor sub-unit further includes geometry processing circuitry; and the control circuitry is configured to execute multiple distributed sets of graphics work on multiple different graphics processor sub-units of the set of graphics processor sub-units in parallel.

4. The apparatus of claim 1, wherein the control circuitry is configured to provide status information to software for the first set of graphics work.

5. The apparatus of claim 4, wherein the control circuitry supports at least the following status states:
waiting on dependencies;
waiting for configuration data for the first set of graphics work; and
waiting for assignment to the distributed hardware slots of the multiple distributed hardware slots of one or more graphics processor sub-units of the set of graphics processor sub-units.

6. The apparatus of claim 4, wherein the status information includes:
identification of the first logical slot;
identification of assigned distributed hardware slots; and
timestamp information associated with the execution of the first set of graphics work.

7. The apparatus of claim 1, wherein the control circuitry is configured to determine the mappings based on the following types of software overrides:
a specified distribution rule that indicates whether to distribute to only a portion of the set of graphics processor sub-units or to distribute to all of the set of graphics processor sub-units; and
group information that indicates a group of graphics processor sub-units on which the first set of graphics work is to be deployed.

8. The apparatus of claim 7, wherein the control circuitry is configured to determine the mappings based on the following additional types of software overrides:
mask information that indicates which of the set of graphics processor sub-units are available to the first set of graphics work; and
policy information that indicates a scheduling policy.

9. The apparatus of claim 1, further comprising:
control stream processor circuitry configured to determine distribution rules for the mappings; and
distributed slot resource allocator circuitry configured to determine the mappings based on:
software input;
determined distribution rules from the control stream processor circuitry; and
distributed slot state information.

10. The apparatus of claim 9, wherein the distributed slot resource allocator circuitry is configured to perform a reclaim procedure that allows a logical slot with a first software-indicated priority level to reclaim a distributed hardware slot that was assigned to a logical slot with a second, lower priority level.

11. A non-transitory computer readable storage medium having stored thereon design information that specifies a design of a hardware integrated circuit in a format recognized by a semiconductor fabrication system that is configured to use the design information to produce the hardware integrated circuit according to the design, wherein the design information specifies that the hardware integrated circuit includes:
circuitry that implements a plurality of logical slots;
a set of graphics processor sub-units that each implement multiple distributed hardware slots, wherein:

a given distributed hardware slot includes work queue circuitry configured to store graphics work and configuration registers corresponding to the stored graphics work; and
a given graphics processor sub-unit includes shader circuitry configured to execute instructions specified by stored graphics work in the given graphics processor sub-unit's multiple distributed hardware slots, such that assignment of graphics work to a given distributed hardware slot of the multiple distributed hardware slots of the given graphics processor sub-unit assigns execution of the assigned graphics work to the given graphics processor sub-unit's shader circuitry; and
control circuitry configured to:
receive a first set of graphics work that is software-specified and software-indicated priority information for the first set of graphics work;
assign the first set of graphics work to a first logical slot;
determine a set of reserved distributed hardware slots that are reserved for logical slots whose assigned graphics work has a priority level that meets a threshold priority level;
determine mappings between the plurality of logical slots and distributed hardware slots of the multiple distributed hardware slots of one or more graphics processor sub-units of the set of graphics processor sub-units, wherein the mappings are determined according to the determined set of reserved distributed hardware slots such that logical slots whose assigned graphics work has a priority level that do not meet the threshold priority level are mapped only to non-reserved distributed hardware slots;
distribute the first set of graphics work, assigned to the first logical slot, to a first set of one or more target distributed hardware slots of one or more graphics processor sub-units of the set of graphics processor sub-units according to one of the mappings; and
execute the first set of graphics work from the first set of one or more target hardware slots using the shader circuitry of one or more graphics processor sub-units of the set of graphics processor sub-units that implement the first set of one or more target hardware slots.

12. The non-transitory computer readable storage medium of claim 11, wherein, based on software input for the first set of graphics work, the control circuitry is configured to:
maintain mapping of the first set of one or more target distributed hardware slots for the first logical slot after completion of the execution of the first set of graphics work; and
assign the mapped first set of one or more target distributed hardware slots for the first set of graphics work to another logical slot only after software input that indicates to release the mapped first set of one or more target distributed hardware slots.

13. The non-transitory computer readable storage medium of claim 11, wherein the control circuitry is configured to provide status information to software for the first set of graphics work.

14. The non-transitory computer readable storage medium of claim 13, wherein the status information includes:
identification of the first logical slot;
identification of assigned distributed hardware slots; and
timestamp information associated with the execution of the first set of graphics work.

15. The non-transitory computer readable storage medium of claim 11, wherein the control circuitry is configured to determine the mappings based on one or more software overrides of following types of software overrides:
mask information that indicates which of the set of graphics processor sub-units are available to the first set of graphics work;
policy information that indicates a scheduling policy;
a specified distribution rule that indicates whether to distribute to only a portion of the set of graphics processor sub-units or to distribute to all of the set of graphics processor sub-units; and
group information that indicates a group of graphics processor sub-units on which the first set of graphics work is to be deployed.

16. The non-transitory computer readable storage medium of claim 11, wherein the control circuitry is configured to perform a reclaim procedure that allows a logical slot with a first software-indicated priority level to reclaim a distributed hardware slot that was assigned to a logical slot with a second, lower priority level.

17. A method, comprising:
receiving, by control circuitry of a graphics processor, a first set of graphics work that is software-specified and software-indicated priority information for the first set of graphics work;
assigning, by the control circuitry the first set of graphics work to a first logical slot of a plurality of logical slots implemented by the graphics processor;
determining, by the control circuitry, a set of reserved distributed hardware slots that are reserved for logical slots whose assigned graphics work has a priority level that meets a threshold priority level;
determining, by the control circuitry, mappings between logical slots and distributed hardware slots of a set of graphics processor sub-units that each implement multiple distributed hardware slots, wherein:
a given distributed hardware slot includes work queue circuitry configured to store graphics work and configuration registers corresponding to the stored graphics work;
a given graphics processor sub-unit includes shader circuitry configured to execute instructions specified by stored graphics work in the given graphics processor sub-unit's multiple distributed hardware slots, such that assignment of graphics work to a given distributed hardware slot of the multiple distributed hardware slots of the given graphics processor sub-unit assigns execution of the assigned graphics work of the given distributed hardware slot to the given graphics processor sub-unit's shader circuitry; and
the mappings are determined according to the determined set of reserved distributed hardware slots such that logical slots whose assigned graphics work has a priority level that does not meet a threshold priority level are mapped only to non-reserved distributed hardware slots;
distributing, by the control circuitry, the first set of graphics work, assigned to the first logical slot, to a first set of one or more target distributed hardware slots of one or more graphics processor sub-units of the set of graphics processor sub-units according to one of the mappings; and
executing, by the one or more graphics processor sub-units of the set of graphics processor sub-units, the first set of graphics work from the first set of one or more target hardware slots using the shader circuitry of the one or more graphics processor sub-units of the set of graphics processor sub-units that implement the first set of one or more target hardware slots.

18. The method of claim 17, further comprising:
maintaining, by the control circuitry, mapping of the first set of one or more target distributed hardware slots for the first logical slot after completion of the execution of the first set of graphics work; and
assigning, by the control circuitry, the mapped first set of one or more target distributed hardware slots for the first set of graphics work to another logical slot only after software input that indicates to release the mapped first set of one or more target distributed hardware slots.

19. The method of claim 17, further comprising:
providing, by the control circuitry, status information to software for the first set of graphics work, including:
identification of the first logical slot;
identification of assigned distributed hardware slots; and
timestamp information associated with the execution of the first set of graphics work.

20. The method of claim 17, further comprising:
wherein the determining the mappings is based on one or more software overrides of following types of software overrides:
mask information that indicates which of the set of graphics processor sub-units are available to the first set of graphics work;
policy information that indicates a scheduling policy;
a specified distribution rule that indicates whether to distribute to only a portion of the set of graphics processor sub-units or to distribute to all of the set of graphics processor sub-units; and
group information that indicates a group of graphics processor sub-units on which the first set of graphics work is to be deployed.

* * * * *